US011888562B2

(12) United States Patent
Rahman et al.

(10) Patent No.: US 11,888,562 B2
(45) Date of Patent: Jan. 30, 2024

(54) METHOD AND APPARATUS FOR RECIPROCITY BASED CSI-RS TRANSMISSION AND RECEPTION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 181 days.

(21) Appl. No.: 17/138,572

(22) Filed: Dec. 30, 2020

(65) Prior Publication Data

US 2021/0211173 A1 Jul. 8, 2021

Related U.S. Application Data

(60) Provisional application No. 63/112,346, filed on Nov. 11, 2020, provisional application No. 62/956,973, filed on Jan. 3, 2020.

(51) Int. Cl.
*H04B 7/06* (2006.01)
*H04J 1/16* (2006.01)
(Continued)

(52) U.S. Cl.
CPC .............. *H04B 7/0626* (2013.01); *H04J 1/16* (2013.01); *H04L 5/0048* (2013.01); *H04W 24/08* (2013.01)

(58) Field of Classification Search
CPC .................................................. H04B 7/0626
See application file for complete search history.

(56) References Cited

U.S. PATENT DOCUMENTS 9,967,012 B2 * 5/2018 Onggosanusi ....... H04B 7/0632
2016/0359538 A1 * 12/2016 Onggosanusi ........ H04L 5/0057
(Continued)

FOREIGN PATENT DOCUMENTS

WO 2011088403 A1 7/2011
WO 2016163843 A1 10/2016
WO WO-2022150484 A1 * 7/2022

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.3.0, Sep. 2020, 249 pages.
(Continued)

*Primary Examiner* — Abdeltif Ajid

(57) ABSTRACT

A method for operating a user equipment (UE) comprises receiving configuration information for at least one channel state information reference signal (CSI-RS) resource that comprises $P_{CSIRS}$ CSI-RS ports; receiving configuration information for channel state information (CSI) feedback that is based on Q precoding dimensions, wherein: there is a mapping between the $P_{CSIRS}$ CSI-RS ports and the Q precoding dimensions, and $P_{CSIRS} \neq Q$; measuring the $P_{CSIRS}$ CSI-RS ports; determining a measurement for the Q precoding dimensions based on the mapping and the measurement for the $P_{CSIRS}$ CSI-RS ports; determining a CSI feedback based on the measurement for the Q precoding dimensions; and transmitting, over an uplink (UL) channel, the determined CSI feedback.

20 Claims, 14 Drawing Sheets

(51) Int. Cl.
*H04W 24/08* (2009.01)
*H04L 5/00* (2006.01)

(56) References Cited

U.S. PATENT DOCUMENTS

| | | | |
|---|---|---|---|
| 2017/0244459 | A1 | 8/2017 | Chen et al. |
| 2017/0279509 | A1* | 9/2017 | Rahman ............... H04B 7/0639 |
| 2019/0007112 | A1 | 1/2019 | Faxer et al. |
| 2019/0280750 | A1* | 9/2019 | Rahman ............ H04L 25/03923 |
| 2019/0334587 | A1 | 10/2019 | Rahman et al. |
| 2020/0067583 | A1* | 2/2020 | Shin ...................... H04L 5/0053 |
| 2021/0409991 | A1* | 12/2021 | Park ..................... H04B 7/0695 |
| 2022/0006496 | A1* | 1/2022 | Park ...................... H04W 72/23 |
| 2022/0393736 | A1* | 12/2022 | Park .................... H04B 7/0486 |

OTHER PUBLICATIONS

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.3.0, Sep. 2020, 253 pages.
"3rd Generation Partnership Project; Technical Specification Group Radio Access Network; Evolved Universal Terrestrial Radio Access (E-UTRA); Physical layer procedures (Release 16)", 3GPP TS 36.213 V16.3.0, Sep. 2020, 577 pages.
"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.2.0, Sep. 2020, 141 pages.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.2.1, Sep. 2020, 1,081 pages.
"3rd Generation Partnership Project; Technical Specification Group Services and System Aspects; Feasibility Study on New Services and Markets Technology Enablers; Stage 1 (Release 14)", 3GPP TR 22.891 V14.2.0, Sep. 2016, 95 pages.
"3rd Generation Partnership Project; Technical Specification Group Radio Access Network; NR; Multiplexing and channel coding (Release 16)", 3GPP TS 38.212 V16.3.0, Sep. 2020, 497 pages.
"3rd Generation Partnership Project; Technical Specification Group Radio Access Network; NR; Physical layer procedures for control (Release 16)", 3GPP TS 38.213 V16.3.0, Sep. 2020, 179 pages.
"3rd Generation Partnership Project; Technical Specification Group Radio Access Network; NR; Physical layer procedures for data (Release 16)", 3GPP TS 38.214 V16.3.0, Sep. 2020, 166 pages.
International Search Report and Written Opinion of the International Searching Authority dated Apr. 15, 2021 in connection with International Application No. PCT/KR2020/019493, 10 pages.
3GPP TS 38.214 V15.7.0 (Sep. 2019), Technical Specification, 3rd Generation Partnership Project; Technical Specification Group Radio Access Network; NR; Physical layer procedures for data (Release 15), Sep. 2019, 106 pages.
Extended European Search Report dated Nov. 4, 2022 regarding Application No. 20909452.3, 12 pages.
"5G; NR; Physical layer procedures for data (3GPP TS 38.214 version 15.8.0 Release 15)", ETSI TS 138 214 V15.8.0, Jan. 2020, 109 pages.
Ericsson, "On CSI enhancements for MU-MIMO", 3GPP TSG RAN WG1 Meeting Ad-Hoc Meeting 1901, R1-1900757, Jan. 2019, 12 pages.
Fraunhofer IIS et al., "Enhancements on Type-II CSI reporting", 3GPP TSG-RAN WG1 AH-1901, R1-1901305, Jan. 2019, 18 pages.

* cited by examiner

METHOD AND APPARATUS FOR RECIPROCITY BASED CSI-RS TRANSMISSION AND RECEPTION

CROSS-REFERENCE TO RELATED APPLICATIONS AND CLAIM OF PRIORITY

The present application claims priority to U.S. Provisional Patent Application No. 62/956,973, filed on Jan. 3, 2020 and U.S. Provisional Patent Application No. 63/112,346, filed on Nov. 11, 2020. The content of the above-identified patent documents is incorporated herein by reference.

TECHNICAL FIELD

The present disclosure relates generally to wireless communication systems and more specifically to reciprocity based channel state information reference signal (CSI-RS) transmission and reception.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses to enable channel state information (CSI) reporting in a wireless communication system.

In one embodiment, a UE for CSI reporting in a wireless communication system is provided. The UE includes a transceiver configured to receive configuration information for at least one channel state information reference signal (CSI-RS) resource that comprises $P_{CSIRS}$ CSI-RS ports; and receive configuration information for channel state information (CSI) feedback that is based on Q precoding dimensions, wherein: there is a mapping between the $P_{CSIRS}$ CSI-RS ports and the Q precoding dimensions, and $P_{CSIRS} \neq Q$. The UE further includes a processor operably connected to the transceiver. The processor is configured to measure the $P_{CSIRS}$ CSI-RS ports; determine a measurement for the Q precoding dimensions based on the mapping and the measurement for the $P_{CSIRS}$ CSI-RS ports; and determine a CSI feedback based on the measurement for the Q precoding dimensions. The transceiver is further configured to transmit, over an uplink (UL) channel, the determined CSI feedback.

In another embodiment, a BS in a wireless communication system is provided. The BS includes a processor configured to generate configuration information for at least one channel state information reference signal (CSI-RS) resource that comprises $P_{CSIRS}$ CSI-RS ports; and generate configuration information for channel state information (CSI) feedback that is based on Q precoding dimensions, wherein: there is a mapping between the $P_{CSIRS}$ CSI-RS ports and the Q precoding dimensions, and $P_{CSIRS} \neq Q$. The BS further includes a transceiver operably connected to the processor. The transceiver is configured to: transmit the configuration information for the at least one CSI-RS resource; transmit the configuration information for the CSI feedback; transmit the at least one CSI-RS resource from the $P_{CSIRS}$ CSI-RS ports; and receive, over an uplink (UL) channel, the CSI feedback; wherein: the CSI feedback is based on the Q precoding dimensions, and the Q precoding dimensions are based on the mapping and the $P_{CSIRS}$ CSI-RS ports.

In yet another embodiment, a method for operating a UE is provided. The method comprises: receiving configuration information for at least one channel state information reference signal (CSI-RS) resource that comprises $P_{CSIRS}$ CSI-RS ports; receiving configuration information for channel state information (CSI) feedback that is based on Q precoding dimensions, wherein: there is a mapping between the $P_{CSIRS}$ CSI-RS ports and the Q precoding dimensions, and $P_{CSIRS} \neq Q$; measuring the $P_{CSIRS}$ CSI-RS ports; determining a measurement for the Q precoding dimensions based on the mapping and the measurement for the $P_{CSIRS}$ CSI-RS ports; determining a CSI feedback based on the measurement for the Q precoding dimensions; and transmitting, over an uplink (UL) channel, the determined CSI feedback.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
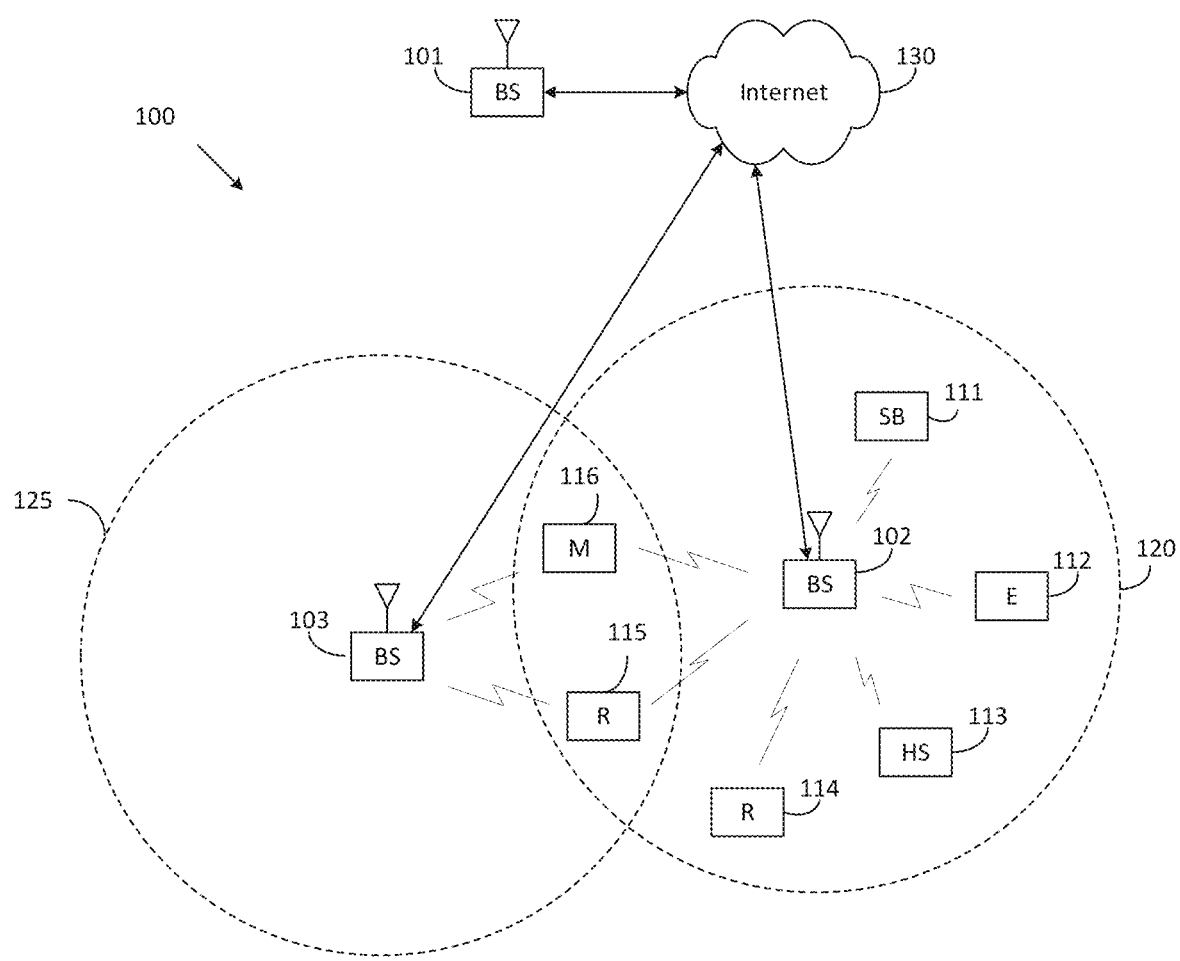
FIG. 1 illustrates an example wireless network according to embodiments of the present disclosure.

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.3.0, "E-UTRA, Physical channels and modulation" (herein "REF 1"); 3GPP TS 36.212 v16.3.0, "E-UTRA, Multiplexing and Channel coding" (herein "REF 2"); 3GPP TS 36.213 v16.3.0, "E-UTRA, Physical Layer Procedures" (herein "REF 3"); 3GPP TS 36.321 v16.3.0, "E-UTRA, Medium Access Control (MAC) protocol specification" (herein "REF 4"); 3GPP TS 36.331 v16.3.0, "E-UTRA, Radio Resource Control (RRC) protocol specification" (herein "REF 5"); 3GPP TR 22.891 v14.2.0 (herein "REF 6"); 3GPP TS 38.212 v16.3.0, "E-UTRA, NR, Multiplexing and channel coding" (herein "REF 7"); 3GPP TS 38.214 v16.3.0, "E-UTRA, NR, Physical layer procedures for data" (herein "REF 8"); and 3GPP TS 38.213 v16.3.0, "E-UTRA, NR, Physical Layer Procedures for control" (herein "REF 9").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

Figure 2:
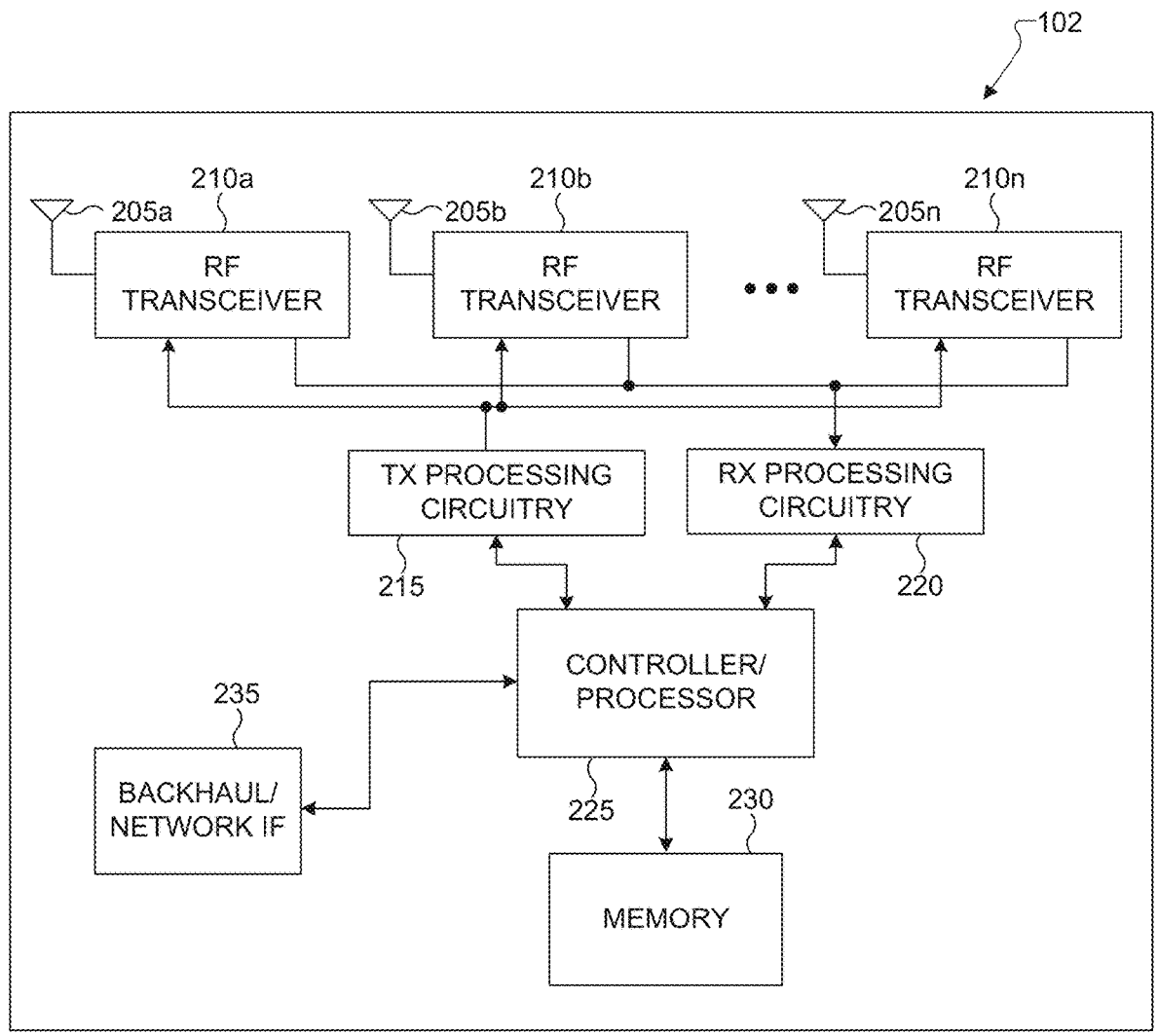
FIG. 2 illustrates an example gNB according to embodiments of the present disclosure.
Figure 3:
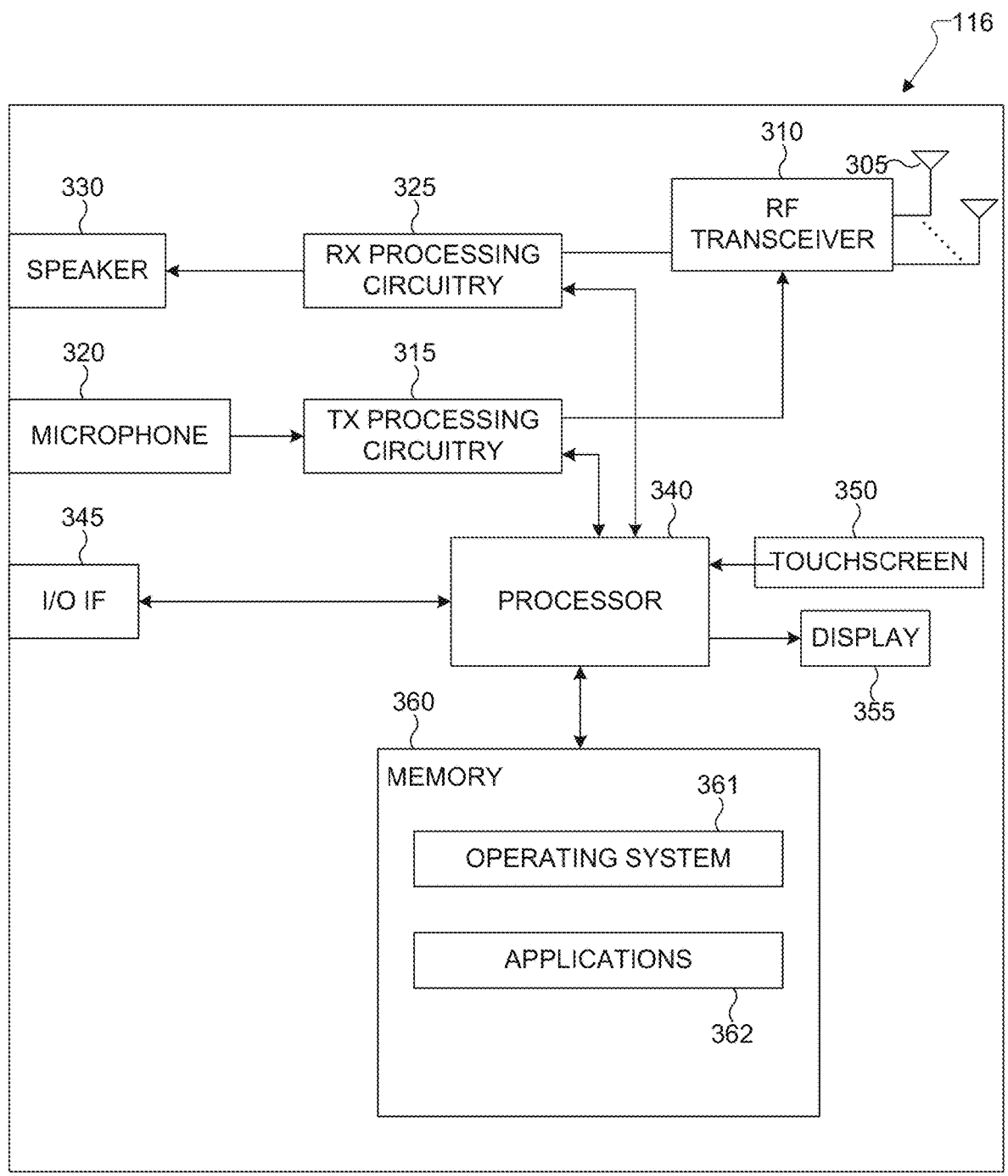
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information for at least one channel state information reference signal (CSI-RS) resource that comprises $P_{CSIRS}$ CSI-RS ports; receiving configuration information for channel state information (CSI) feedback that is based on Q precoding dimensions, wherein: there is a mapping between the $P_{CSIRS}$ CSI-RS ports and the Q precoding dimensions, and $P_{CSIRS} \neq Q$ measuring the $P_{CSIRS}$ CSI-RS ports; determining a measurement for the Q precoding dimensions based on the mapping and the measurement for the $P_{CSIRS}$ CSI-RS ports; determining a CSI feedback based on the measurement for the Q precoding dimensions; and transmitting, over an uplink (UL) channel, the determined CSI feedback, and one or more of the gNBs 101-103 includes circuitry, programing, or a combination thereof, for generating configuration information for at least one channel state information reference signal (CSI-RS) resource that comprises $P_{CSIRS}$ CSI-RS ports; generating configuration information for channel state information (CSI) feedback that is based on Q precoding dimensions, wherein: there is a mapping between the $P_{CSIRS}$ CSI-RS ports and the Q precoding dimensions, and $P_{CSIRS} \neq Q$; transmitting the configuration information for the at least one CSI-RS resource; transmitting the configuration information for the CSI feedback; transmitting the at least one CSI-RS resource from the $P_{CSIRS}$ CSI-RS ports; and receiving, over an uplink (UL) channel, the CSI feedback; wherein: the CSI feedback is based on the Q precoding dimensions, and the Q precoding dimensions are based on the mapping and the $P_{CSIRS}$ CSI-RS ports.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information for at least one channel state information reference signal (CSI-RS) resource that comprises $P_{CSIRS}$ CSI-RS ports; receiving configuration information for channel state information (CSI) feedback that is based on Q precoding dimensions, wherein: there is a mapping between the $P_{CSIRS}$ CSI-RS ports and the Q precoding dimensions, and $P_{CSIRS} \neq Q$; measuring the $P_{CSIRS}$ CSI-RS ports; determining a measurement for the Q precoding dimensions based on the mapping and the measurement for the $P_{CSIRS}$ CSI-RS ports; determining a CSI feedback based on the measurement for the Q precoding dimensions; and transmitting, over an uplink (UL) channel, the determined CSI feedback. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
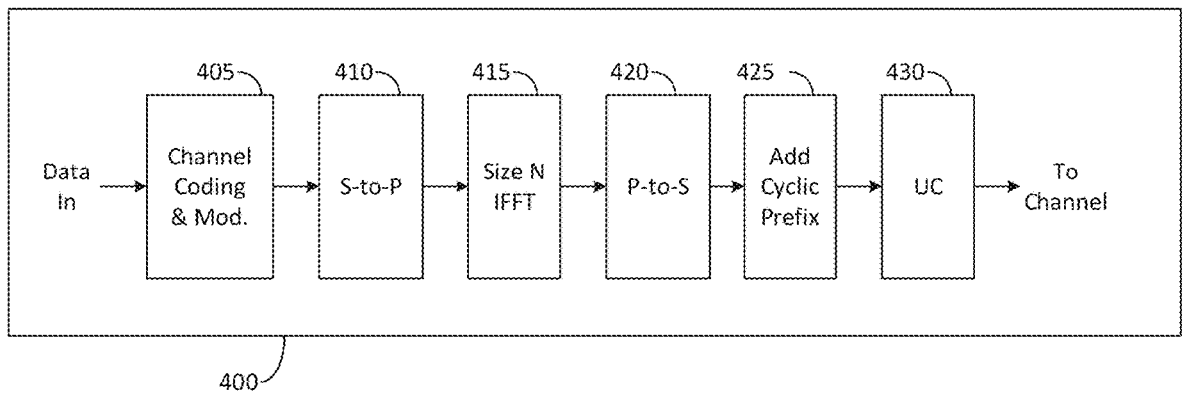
FIG. 4A illustrates a high-level diagram of an orthogonal frequency division multiple access transmit path according to embodiments of the present disclosure.
Figure 4B:
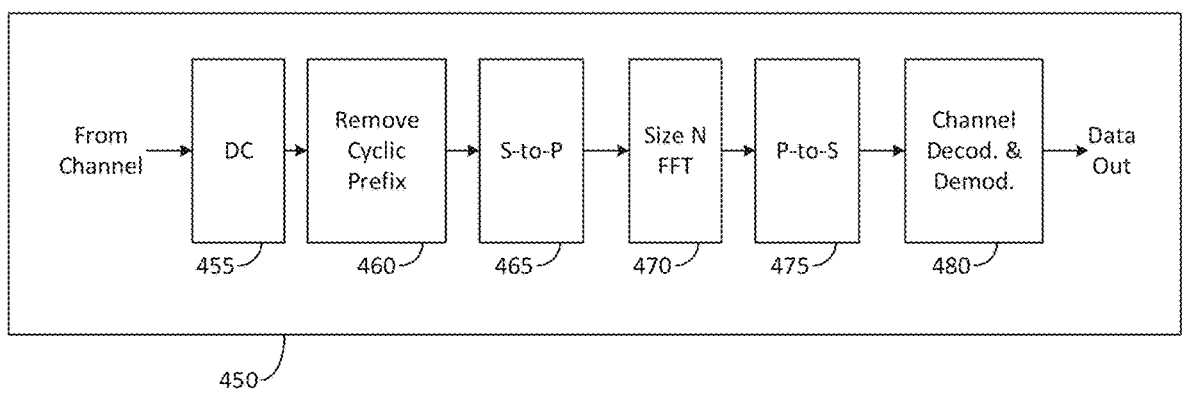
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460, and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNB s 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (M_{symb}^{UL}-1)-N_{SRS}$, where $N_{SRS}=1$ if a last subframe symbol is used to transmit SRS and $N_{SRS}=0$ otherwise.

Figure 5:
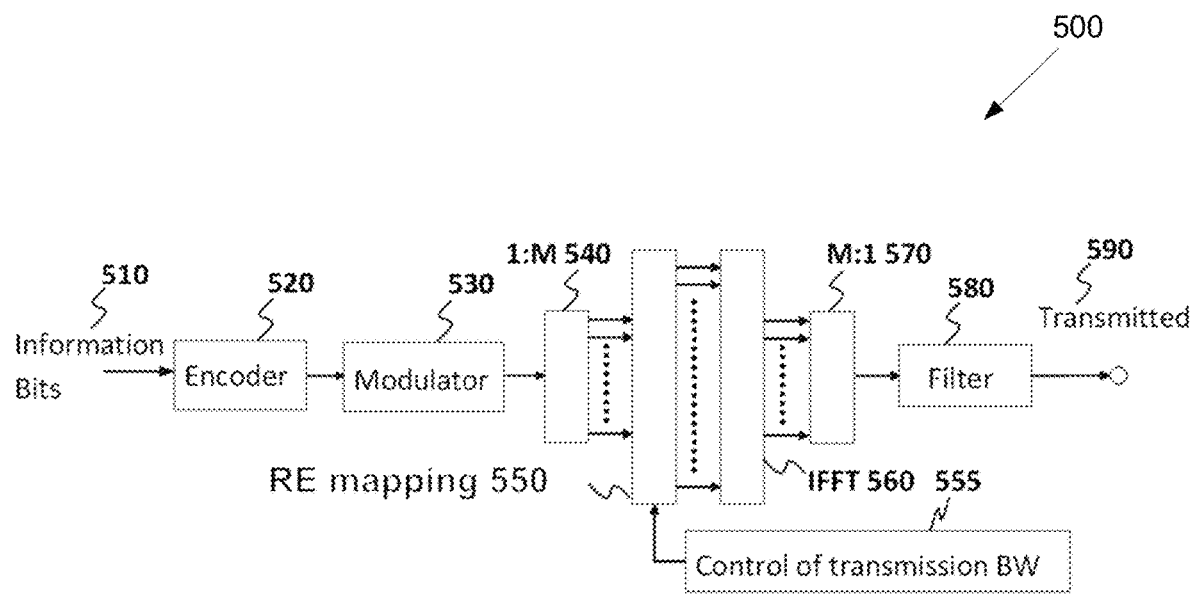
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
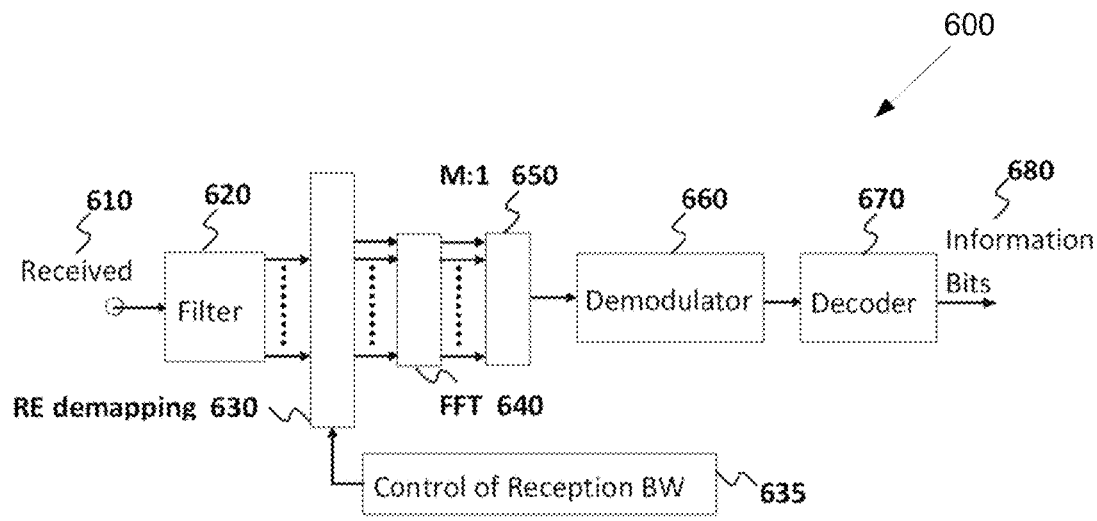
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
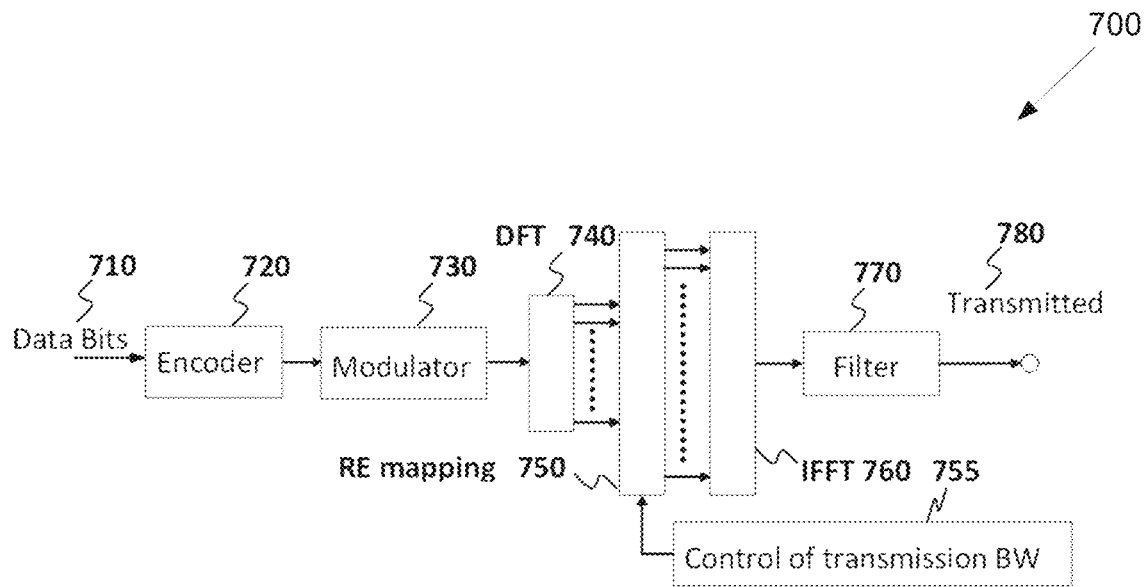
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
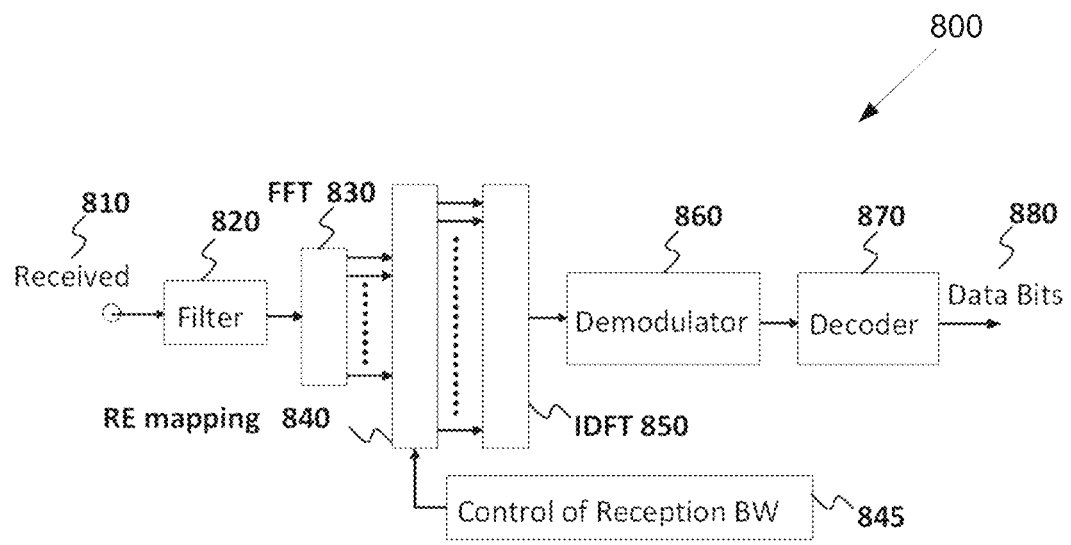
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

Figure 9:
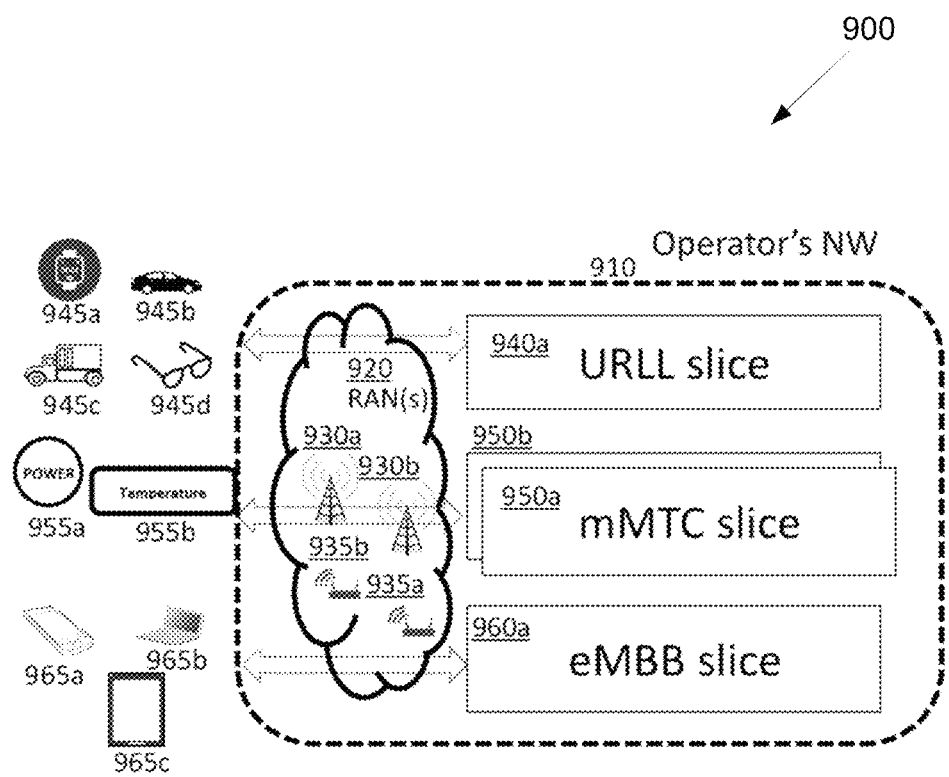
FIG. 9 illustrates an example network configuration according to embodiments of the present disclosure.

FIG. 9 illustrates an example network configuration 900 according to embodiments of the present disclosure. The embodiment of the network configuration 900 illustrated in FIG. 9 is for illustration only. FIG. 9 does not limit the scope of this disclosure to any particular implementation of the configuration 900.

In order for the 5G network to support such diverse services with different quality of services (QoS), one scheme has been identified in 3GPP specification, called network slicing.

As shown in FIG. 9, an operator's network 910 includes a number of radio access network(s) 920 (RAN(s)) that are associated with network devices such as gNBs 930a and 930b, small cell base stations (femto/pico gNBs or Wi-Fi access points) 935a and 935b. The network 910 can support various services, each represented as a slice.

In the example, an URLL slice 940a serves UEs requiring URLL services such as cars 945b, trucks 945c, smart watches 945a, and smart glasses 945d. Two mMTC slices 950a and 950b serve UEs requiring mMTC services such as power meters 955a, and temperature control box 955b. One eMBB slice 960a serves UEs requiring eMBB services such as cells phones 965a, laptops 965b, and tablets 965c. A device configured with two slices can also be envisioned.

To utilize PHY resources efficiently and multiplex various slices (with different resource allocation schemes, numerologies, and scheduling strategies) in DL-SCH, a flexible and self-contained frame or subframe design is utilized.

Figure 10:
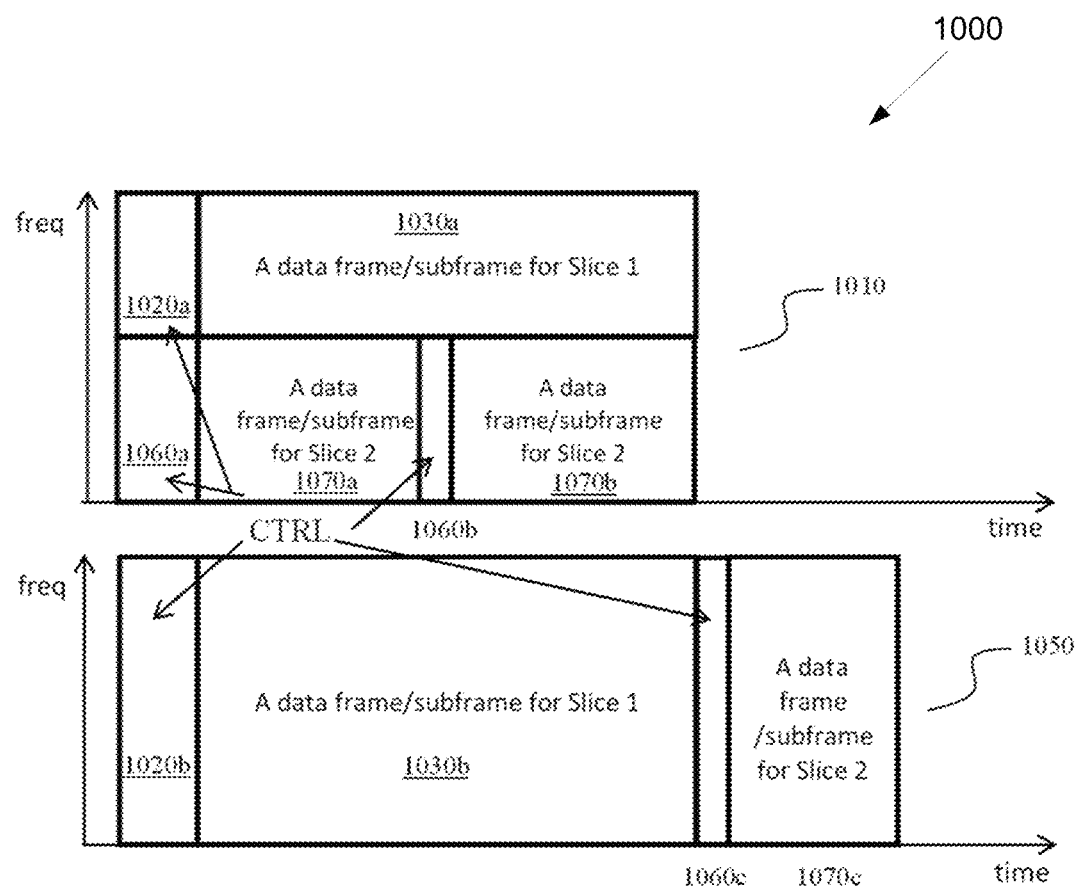
FIG. 10 illustrates an example multiplexing of two slices according to embodiments of the present disclosure.

FIG. 10 illustrates an example multiplexing of two slices 1000 according to embodiments of the present disclosure. The embodiment of the multiplexing of two slices 1000 illustrated in FIG. 10 is for illustration only. One or more of the components illustrated in FIG. 10 can be implemented in specialized circuitry configured to perform the noted functions or one or more of the components can be implemented by one or more processors executing instructions to perform the noted functions. FIG. 10 does not limit the scope of this disclosure to any particular implementation of the multiplexing of two slices 1000.

Two exemplary instances of multiplexing two slices within a common subframe or frame are depicted in FIG. 10. In these exemplary embodiments, a slice can be composed of one or two transmission instances where one transmission instance includes a control (CTRL) component (e.g., 1020a, 1060a, 1060b, 1020b, or 1060c) and a data component (e.g., 1030a, 1070a, 1070b, 1030b, or 1070c). In embodiment 1010, the two slices are multiplexed in frequency domain whereas in embodiment 1050, the two slices are multiplexed in time domain.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 11:
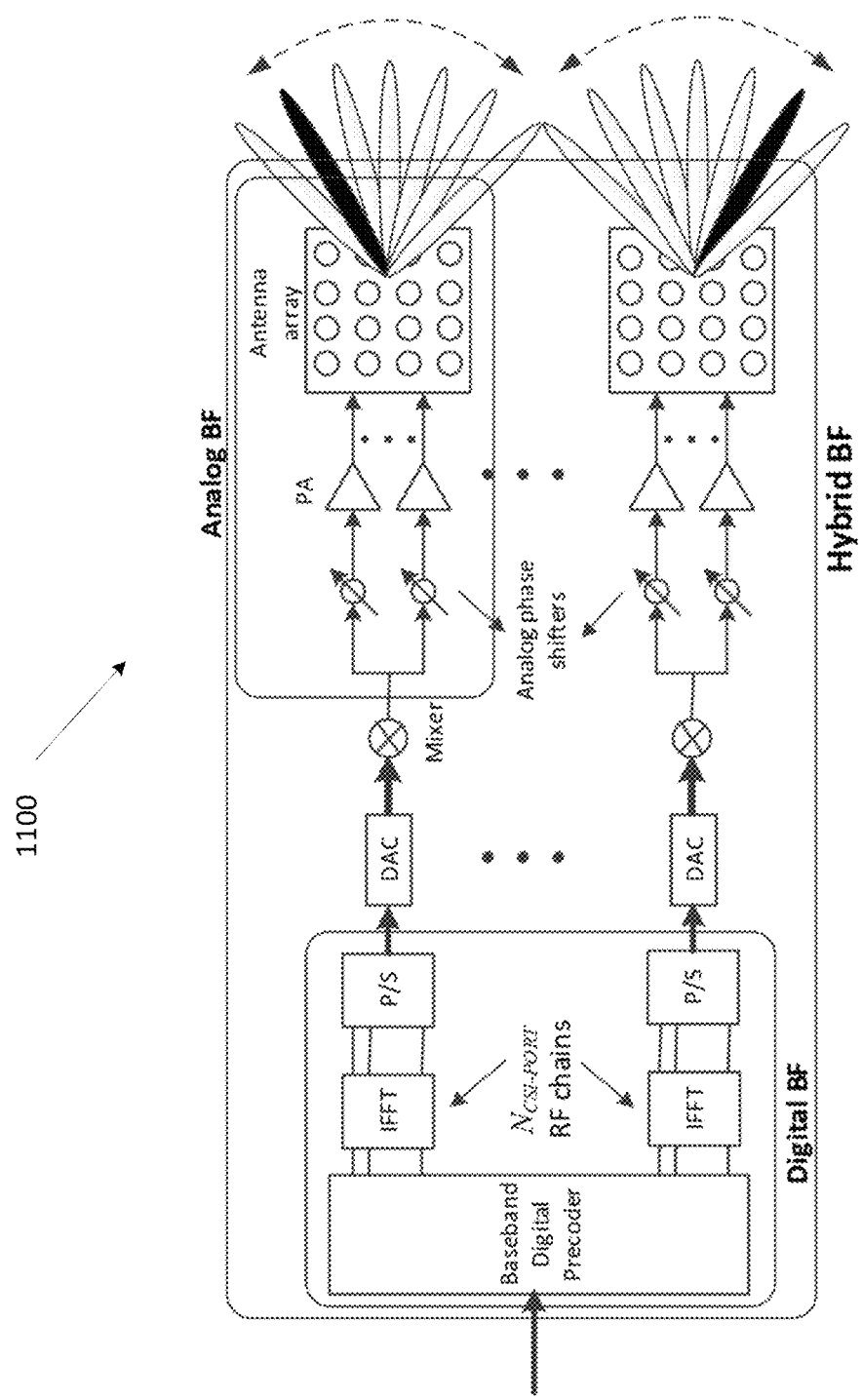
FIG. 11 illustrates an example antenna blocks according to embodiments of the present disclosure.

FIG. 11 illustrates an example antenna blocks 1100 according to embodiments of the present disclosure. The embodiment of the antenna blocks 1100 illustrated in FIG. 11 is for illustration only. FIG. 11 does not limit the scope of this disclosure to any particular implementation of the antenna blocks 1100.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 11. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanisms corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2.

This approach is termed hybrid CSI-RS. The implementation of hybrid CSI-RS is largely dependent on the definition of CSI process and NZP CSI-RS resource.

In the 3GPP LTE specification, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, the CSI can be acquired using the CSI-RS transmission from the eNB, and CSI acquisition and feedback from the UE. In legacy FDD systems, the CSI feedback framework is 'implicit' in the form of CQI/PMI/RI derived from a codebook assuming SU transmission from the eNB. Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at the eNB. For large number of antenna ports, the codebook design for implicit feedback is quite complicated, and the designed codebook is not guaranteed to bring justifiable performance benefits in practical deployment scenarios (for example, only a small percentage gain can be shown at the most).

In 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

Figure 12:
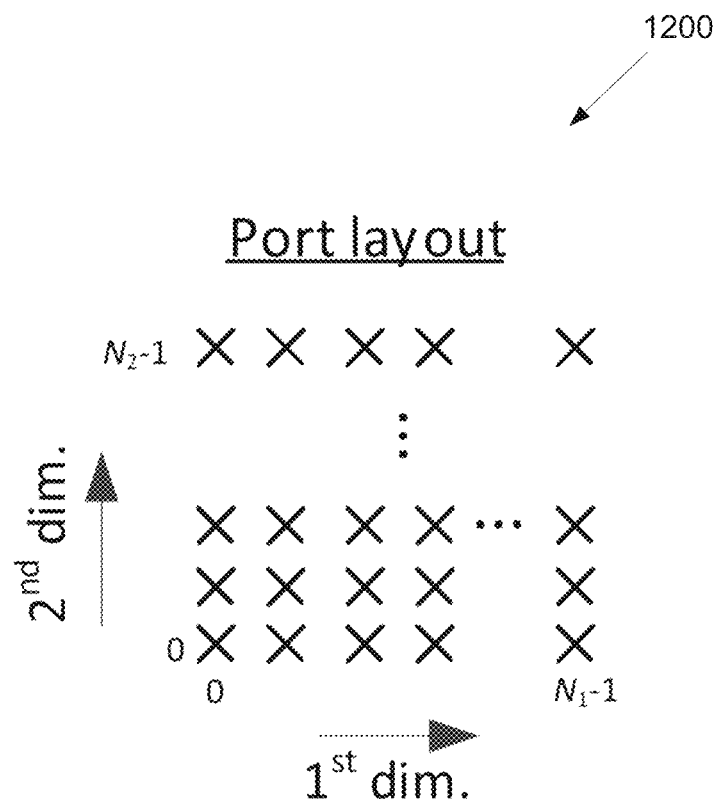
FIG. 12 illustrates an antenna port layout according to embodiments of the present disclosure.

FIG. 12 illustrates an example antenna port layout 1200 according to embodiments of the present disclosure. The embodiment of the antenna port layout 1200 illustrated in FIG. 12 is for illustration only. FIG. 12 does not limit the scope of this disclosure to any particular implementation of the antenna port layout 1200.

As illustrated in FIG. 12, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$.

As described in U.S. Pat. No. 10,659,118, issued May 19, 2020 and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 13:
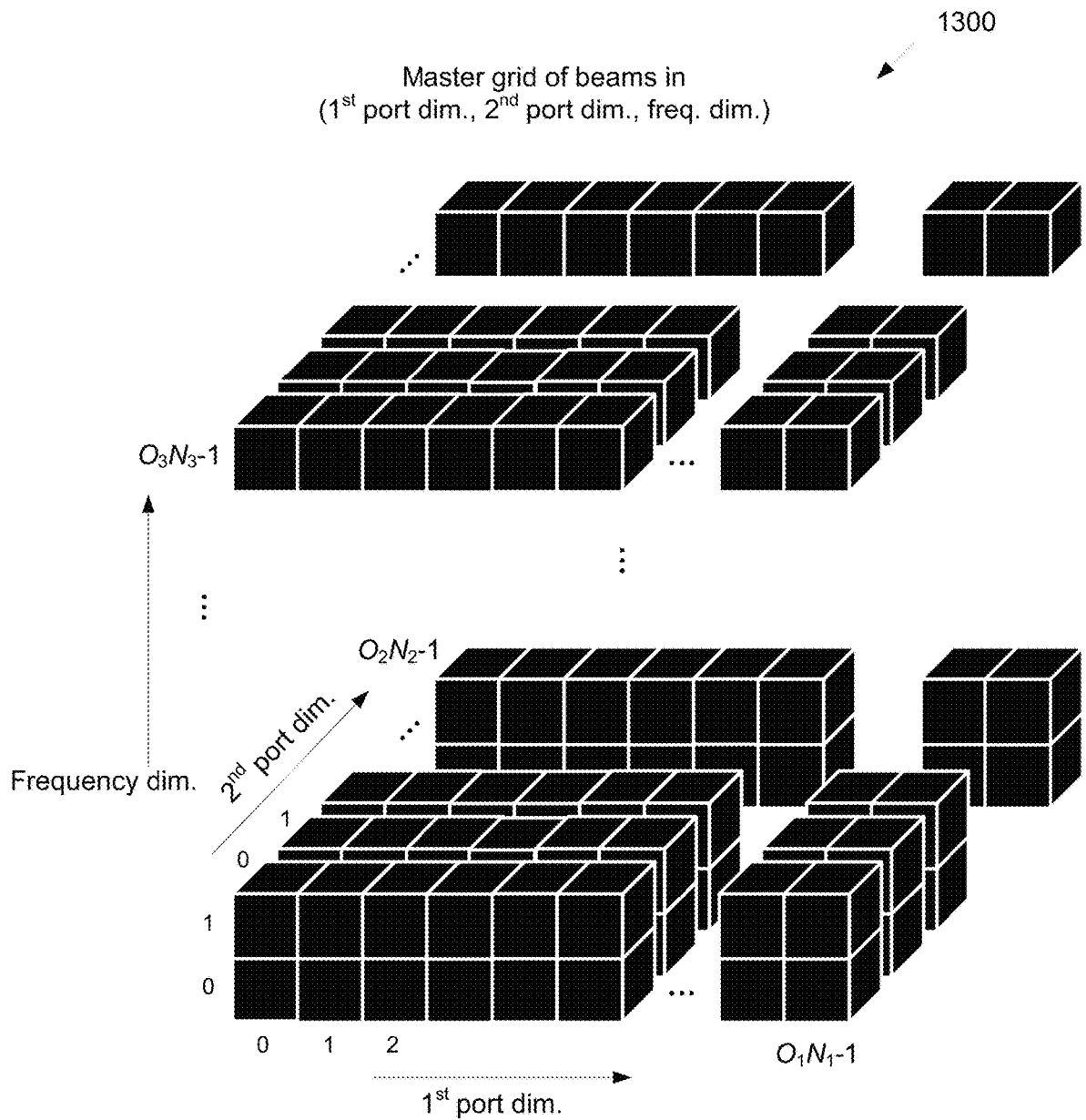
FIG. 13 illustrates a 3D grid of oversampled DFT beams according to embodiments of the present disclosure.

FIG. 13 illustrates a 3D grid 1300 of the oversampled DFT beams (1st port dim., 2nd port dim., freq. dim.) in which
- 1st dimension is associated with the 1st port dimension,
- 2nd dimension is associated with the 2nd port dimension, and
- 3rd dimension is associated with the frequency dimension.

The basis sets for 1st and 2nd port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to $\{2, 4, 8\}$. In yet another example, at least one of $O_1$, $O_2$, and $O_3$ is higher layer configured (via RRC signaling).

A UE is configured with higher layer parameter CodebookType set to 'TypeII-Compression' or 'TypeIII' for an enhanced Type II CSI reporting in which the pre-coders for all subbands (SBs) and for a given layer l=1, ..., v, where v is the associated RI value, is given by either $$W^l = AC_lB^H = [a_0 a_1 \ldots a_{L-1}] \begin{bmatrix} c_{l,0,0} & c_{l,0,1} & \ldots & c_{l,0,M-1} \\ c_{l,1,0} & c_{l,1,1} & \ldots & c_{l,1,M-1} \\ \vdots & \vdots & \vdots & \vdots \\ c_{l,L-1,0} & c_{l,L-1,1} & \ldots & c_{l,L-1,M-1} \end{bmatrix} [b_0 b_1 \ldots b_{M-1}]^H = \qquad \text{(Eq. 1)}$$

$$\sum_{f=0}^{M-1}\sum_{i=0}^{L-1} c_{l,i,f}(a_i b_f^H) = \sum_{i=0}^{L-1}\sum_{f=0}^{M-1} c_{l,i,f}(a_i b_f^H),$$

or $$W^l = \begin{bmatrix} A & 0 \\ 0 & A \end{bmatrix} C_l B^H = \begin{bmatrix} a_0 a_1 \ldots a_{L-1} & 0 \\ 0 & a_0 a_1 \ldots a_{L-1} \end{bmatrix} \qquad \text{(Eq. 2)}$$

$$\begin{bmatrix} c_{l,0,0} & c_{l,0,1} & \ldots & c_{l,0,M-1} \\ c_{l,1,0} & c_{l,1,1} & \ldots & c_{l,1,M-1} \\ \vdots & \vdots & \vdots & \vdots \\ c_{l,L-1,0} & c_{l,L-1,1} & \ldots & c_{l,L-1,M-1} \end{bmatrix} [b_0 b_1 \ldots b_{M-1}]^H =$$

$$\begin{bmatrix} \sum_{f=0}^{M-1}\sum_{i=0}^{L-1} c_{l,i,f}(a_i b_f^H) \\ \sum_{f=0}^{M-1}\sum_{i=0}^{L-1} c_{l,i+L,f}(a_i b_f^H) \end{bmatrix},$$

where
- $N_1$ is a number of antenna ports in a first antenna port dimension (having the same antenna polarization),
- $N_2$ is a number of antenna ports in a second antenna port dimension (having the same antenna polarization),
- $N_3$ is a number of SBs for PMI reporting or number of FD units or number of FD components (that comprise the CSI reporting band) or a total number of precoding matrices indicated by the PMI,
- $a_i$ is a $2N_1N_2 \times 1$ (Eq. 1) or $N_1N_2 \times 1$ (Eq. 2) column vector,
- $b_f$ is a $N_3 \times 1$ column vector,
- $c_{l,i,f}$ is a complex coefficient.

In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f} \times c_{l,i,f}$ where
- $x_{l,i,f}=1$ if the coefficient $c_{l,i,f}$ is reported by the UE according to some embodiments of this invention.
- $x_{l,i,f}=0$ otherwise (i.e., $c_{l,i,f}$ is not reported by the UE).

The indication whether $x_{l,i,f}=1$ or 0 is according to some embodiments of this invention. For example, it can be via a bitmap.

In a variation, the precoder equations Eq. 1 or Eq. 2 are respectively generalized to $$W^l = \sum_{i=0}^{L-1} \sum_{f=0}^{M_i-1} = c_{l,i,f}(a_i b_i^H) \qquad (Eq.\ 3)$$

and $$W^l = \begin{bmatrix} \sum_{i=0}^{L-1} \sum_{f=0}^{M_i-1} c_{l,i,f}(a_i b_{i,f}^H) \\ \sum_{i=0}^{L-1} \sum_{l=0}^{M_i-1} c_{l,i+L,f}(a_i b_{i,f}^H) \end{bmatrix}, \qquad (Eq.\ 4)$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}} [W^1\ W^2\ \ldots\ W^R].$$

Eq. 2 is assumed in the rest of the disclosure. The embodiments of the disclosure, however, are general and are also application to Eq. 1, Eq. 3 and Eq. 4.

Here $L \leq 2N_1N_2$ and $M \leq N_3$. If $L=2N_1N_2$, then A is an identity matrix, and hence not reported. Likewise, if $M=N_3$, then B is an identity matrix, and hence not reported. Assuming $L<2N_1N_2$, in an example, to report columns of A, the oversampled DFT codebook is used. For instance, $a_i=v_{l,m}$, where the quantity $v_{l,m}$ is given by $$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

Similarly, assuming $M<N_3$, in an example, to report columns of B, the oversampled DFT codebook is used. For instance, $b_f=w_f$, where the quantity $w_f$ is given by $$w_f = \begin{bmatrix} 1 & e^{j\frac{2\pi n_{3,l}^{(f)}}{O_3 N_3}} & e^{j\frac{2\pi \cdot 2 n_{3,l}^{(f)}}{O_3 N_3}} & \ldots & e^{j\frac{2\pi (N_3-1) n_{3,l}^{(f)}}{O_3 N_3}} \end{bmatrix}^T.$$

When $O_3=1$, the FD basis vector for layer $l \in \{1, \ldots, v\}$ (where v is the RI or rank value) is given by $$w_f = [y_{0,l}^{(f)} y_{1,l}^{(f)} \ldots y_{N_3-1,l}^{(f)}]^T,$$

where $$y_{t,l}^{(f)} = e^{j\frac{2\pi t n_{3,l}^{(f)}}{N_3}}$$

and $n_{3,l} = [n_{3,l}^{(0)}, \ldots, n_{3,l}^{(M-1)}]$ where $n_{3,l}^{(f)} \in \{0, 1, \ldots, N_3-1\}$.

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases}, \text{ and}$$

$K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \qquad (5)$$

where $A=W_1$ corresponds to the Rel. 15 $W_1$ in Type II CSI codebook [REF8], and $B=W_f$.

The $C=\tilde{W}_2$ matrix consists of all the required linear combination coefficients (e.g., amplitude and phase or real or imaginary). Each reported coefficient $(c_{l,i,f}=p_{l,i,f}\phi_{l,i,f})$ in $\tilde{W}_2$ is quantized as amplitude coefficient $(p_{l,i,f})$ and phase coefficient $(\phi_{l,i,f})$. In one example, the amplitude coefficient $(p_{l,i,f})$ is reported using a A-bit amplitude codebook where A belongs to $\{2, 3, 4\}$. If multiple values for A are supported, then one value is configured via higher layer signaling. In another example, the amplitude coefficient $(p_{l,i,f})$ is reported as $p_{l,i,f}=p_{l,i,f}^{(1)} p_{l,i,f}^{(2)}$ where
- $p_{l,i,f}^{(1)}$ is a reference or first amplitude which is reported using a A1-bit amplitude codebook where A1 belongs to $\{2, 3, 4\}$, and
- $p_{l,i,f}^{(2)}$ is a differential or second amplitude which is reported using a A2-bit amplitude codebook where A2≤A1 belongs to $\{2, 3, 4\}$.

For layer l, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and $\beta$ is higher layer configured. The remaining $2LM-K_{NZ}$ coefficients that are not reported by the UE are assumed to be zero. The following quantization scheme is used to quantize/report the $K_{NZ}$ NZ coefficients.

The UE reports the following for the quantization of the NZ coefficients in $\tilde{W}_2$ A X-bit indicator for the strongest coefficient index ($i^*$, $f^*$), where $X=\lceil \log_2 K_{NZ} \rceil$ or $\lceil \log_2 2L \rceil$.
Strongest coefficient $c_{l,i^*,f^*}=1$ (hence its amplitude/phase are not reported)
Two antenna polarization-specific reference amplitudes is used.
For the polarization associated with the strongest coefficient $c_{l,i^*,f^*}=1$, since the reference amplitude $p_{l,i,f}^{(1)}=1$, it is not reported
For the other polarization, reference amplitude $p_{l,i,f}^{(1)}$ is quantized to 4 bits
The 4-bit amplitude alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}} \right\}.$$

For $\{c_{l,i,f}, (i, f) \neq (i^*, f^*)\}$:
For each polarization, differential amplitudes $p_{l,i,f}^{(2)}$ of the coefficients calculated relative to the associated polarization-specific reference amplitude and quantized to 3 bits
The 3-bit amplitude alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}.$$

Note: The final quantized amplitude $p_{l,i,f}$ is given by $p_{l,i,f}^{(1)} \times p_{l,i,f}^{(2)}$
Each phase is quantized to either 8PSK ($N_{ph}=8$) or 16PSK ($N_{ph}=16$) (which is configurable).
For the polarization $r^* \in \{0,1\}$ associated with the strongest coefficient $c_{l,i^*,f^*}$, we have $$r^* = \left\lfloor \frac{i^*}{L} \right\rfloor$$

and the reference amplitude $p_{l,i,f}^{(1)} = p_{l,r^*}^{(1)} = 1$. For the other polarization $r \in \{0,1\}$ and $r \neq r^*$, we have $$r = \left( \left\lfloor \frac{i^*}{L} \right\rfloor + 1 \right) \bmod 2$$

and the reference amplitude $p_{l,i,f}^{(1)} = p_{l,r}^{(1)}$ is quantized (reported) using the 4-bit amplitude codebook mentioned above.

A UE can be configured to report M FD basis vectors. In one example, $$M = \left\lceil p \times \frac{N_3}{R} \right\rceil,$$

where R is higher-layer configured from $\{1,2\}$ and p is higher-layer configured from $$\left\{ \frac{1}{4}, \frac{1}{2} \right\}.$$

In one example, the p value is higher-layer configured for rank 1-2 CSI reporting. For rank >2 (e.g., rank 3-4), the p value (denoted by $v_0$) can be different. In one example, for rank 1-4, $(p, v_0)$ is jointly configured from $$\left\{ \left(\frac{1}{2}, \frac{1}{4}\right), \left(\frac{1}{4}, \frac{1}{4}\right), \left(\frac{1}{4}, \frac{1}{8}\right) \right\},$$

i.e.

$$M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3 = N_{SB} \times R$ where $N_{SB}$ is the number of SBs for CQI reporting.

A UE can be configured to report M FD basis vectors in one-step from $N_3$ basis vectors freely (independently) for each layer $l \in \{0, 1, \ldots, v-1\}$ of a rank v CSI reporting. Alternatively, a UE can be configured to report M FD basis vectors in two-step as follows.

In step 1, an intermediate set (InS) comprising $N_3' < N_3$ basis vectors is selected/reported, wherein the InS is common for all layers.

In step 2, for each layer $l \in \{0, 1, \ldots, v-1\}$ of a rank v CSI reporting, M FD basis vectors are selected/reported freely (independently) from $N_3'$ basis vectors in the InS.

In one example, one-step method is used when $N_3 \leq 19$ and two-step method is used when $N_3 > 19$. In one example, $M_3' = \lceil \alpha M \rceil$ where $\alpha > 1$ is either fixed (to 2 for example) or configurable.

The codebook parameters used in the DFT based frequency domain compression (eq. 5) are (L, p, $v_0$, $\beta$, $\alpha$, $N_{ph}$). In one example, the set of values for these codebook parameters are as follows.

L: the set of values is $\{2,4\}$ in general, except $L \in \{2,4,6\}$ for rank 1-2, 32 CSI-RS antenna ports, and R=1.
p for rank 1-2, and (p, $v_0$) for rank 3-4:

$$p \in \left\{\frac{1}{2}, \frac{1}{4}\right\} \text{ and } (p, v_0) \in \left\{ \left(\frac{1}{2}, \frac{1}{4}\right), \left(\frac{1}{4}, \frac{1}{4}\right), \left(\frac{1}{4}, \frac{1}{8}\right) \right\}.$$

$$\beta \in \left\{\frac{1}{4}, \frac{1}{2}, \frac{3}{4}\right\}.$$

$\alpha \in \{1.5, 2, 2.5, 3\}$
$N_{ph} \in \{8, 16\}$.
In another example, the set of values for the codebook parameters (L, p, $v_0$, $\beta$, $\alpha$, $N_{ph}$) are as follows: $\alpha=2$, $N_{ph}=16$, and

| L | p = y₀ (RI = 1-2) | p = v₀ (RI = 3-4) | β | Restriction (if any) |
|---|---|---|---|---|
| 2 | ¼ | ⅛ | ¼ | |
| 2 | ¼ | ⅛ | ½ | |
| 4 | ¼ | ⅛ | ¼ | |
| 4 | ¼ | ⅛ | ½ | |
| 4 | ½ | ¼ | ½ | |
| 6 | ¼ | — | ½ | RI = 1-2, 32 ports |
| 4 | ¼ | ¼ | ¾ | |
| 6 | ¼ | — | ¾ | RI = 1-2, 32 ports |

The above-mentioned framework (equation 5) represents the precoding-matrices for multiple ($N_3$) FD units using a linear combination (double sum) over 2L SD beams and M FD beams. This framework can also be used to represent the precoding-matrices in time domain (TD) by replacing the FD basis matrix $W_f$ with a TD basis matrix $W_t$, wherein the columns of $W_t$ comprises M TD beams that represent some form of delays or channel tap locations. Hence, a precoder $W^l$ can be described as follows.

$$W = A_l C_l B_l^H = W_1 \tilde{W}_2 W_t^H, \quad (5A)$$

In one example, the M TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The rest of the disclosure is applicable to both space-frequency (equation 5) and space-time (equation 5A) frameworks.

In general, for layer l=0, 1, ..., v−1, where v is the rank value reported via RI, the pre-coder (cf. equation 5 and equation 5A) includes the codebook components summarized in Table 1.

TABLE 1

Codebook Components

| Index | Components | Description |
|---|---|---|
| 0 | $L_l$ | number of SD beams |
| 1 | $M_l$ | number of FD/TD beams |
| 2 | $\{a_{l,i}\}_{i=0}^{L_l-1}$ | set of SD beams comprising columns of $A_l$ |
| 3 | $\{b_{l,f}\}_{f=0}^{M_l-1}$ | set of FD/TD beams comprising columns of $B_l$ |
| 4 | $\{x_{l,i,f}\}$ | bitmap indicating the indices of the non-zero (NZ) coefficients |
| 5 | $\{p_{l,i,f}\}$ | amplitudes of NZ coefficients indicated via the bitmap |
| 6 | $\{\phi_{l,i,f}\}$ | phases of NZ coefficients indicated via the bitmap |

In one example, the number of SD beams is layer-common, i.e., $L_l=L$ for all l values. In one example, the set of SD basis is layer-common, i.e., $a_{l,i}=a_i$ for all l values. In one example, the number of FD/TD beams is layer-pair-common or layer-pair-independent, i.e., $M_0=M_1=M$ for layer pair (0, 1), $M_2=M_3=M'$ for layer pair (2, 3), and M and M' can have different values. In one example, the set of FD/TD basis is layer-independent, i.e., $\{b_{l,f}\}$ can be different for different l values. In one example, the bitmap is layer-independent, i.e., $\{\beta_{l,i,f}\}$ can be different for different l values. In one example, the SCI is layer-independent, i.e., $\{SCI_l\}$ can be different for different l values. In one example, the amplitudes and phases are layer-independent, i.e., $\{p_{l,i,f}\}$ and $\{\phi_{l,i,f}\}$ can be different for different l values.

In one example, when the SD basis $W_1$ is a port selection, then the candidate values for L or $L_l$ include 1, and the candidate values for the number of CSI-RS ports $N_{CSI-RS}$ include 2.

In embodiment A, for SD basis, the set of SD beams $\{a_{l,i}\}_{i=0}^{L_l-1}$ comprising columns of $A_l$ is according to at least one of the following alternatives. The SD basis is common for the two antenna polarizations, i.e., one SD basis is used for both antenna polarizations.

In one alternative Alt A-1, the SD basis is analogous to the $W_1$ component in Rel.15 Type II port selection codebook, wherein the $L_l$ antenna ports or column vectors of $A_l$ are selected by the index $$q_1 \in \left\{0, 1, \ldots, \left\lceil \frac{P_{CSI-RS}}{2d} \right\rceil - 1\right\}$$

(this requires $$\left\lceil \log_2 \left\lceil \frac{P_{CSI-RS}}{2d} \right\rceil \right\rceil$$

bits), where $$d \leq \min\left(\frac{P_{CSI-RS}}{2}, L_l\right).$$

In one example, $d \in \{1,2,3,4\}$. To select columns of $A_l$, the port selection vectors are used. For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0). The port selection matrix is then given by $$W_1 = A_l = \begin{bmatrix} X & 0 \\ 0 & X \end{bmatrix} \text{ where } X = \begin{bmatrix} v_{q_1 d} & v_{q_1 d+1} & \cdots & v_{q_1 d+L_l-1} \end{bmatrix}.$$

In one alternative Alt A-2, the SD basis selects $L_l$ antenna ports freely, i.e., the $L_l$ antenna ports per polarization or column vectors of $A_l$ are selected freely by the index $$q_1 \in \left\{0, 1, \ldots, \binom{\frac{P_{CSI-RS}}{2}}{L_l} - 1\right\}$$

(this requires $$\left\lceil \log_2 \binom{\frac{P_{CSI-RS}}{2}}{L_l} \right\rceil$$

bits). To select columns of $A_l$, the port selection vectors are used. For instance, $a_i = v_m$, where the quantity $v_m$ is a $P_{CMI-RS}/2$-element column vector containing a value of 1 in element (m mod $P_{CSI-RS}/2$) and zeros elsewhere (where the first element is element 0). Let $\{x_0, x_1, \ldots, x_{L_l-1}\}$ be indices of selection vectors selected by the index $q_1$. The port selection matrix is then given by $$W_1 = A_l = \begin{bmatrix} X & 0 \\ 0 & X \end{bmatrix}$$

where $$X = \begin{bmatrix} v_{x_0} & v_{x_1} & \cdots & v_{x_{L_l-1}} \end{bmatrix}.$$

In one alternative Alt A-3, the SD basis selects $L_l$ DFT beams from an oversampled DFT codebook, i.e., $a_l = v_{i_1,i_2}$, where the quantity $v_{i_1,i_2}$ is given by $$u_{i_2} = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}.$$

$$v_{i_1,i_2} = \begin{bmatrix} u_{i_2} & e^{j\frac{2\pi i_1}{O_1 N_1}} u_{i_2} & \cdots & e^{j\frac{2\pi i_1(N_1-1)}{O_1 N_1}} u_{i_2} \end{bmatrix}^T$$

In one example, this selection of $L_l$ DFT beams is from a set of orthogonal DFT beams comprising $N_1 N_2$ two-dimensional DFT beams.

In one alternative Alt A-4, the SD basis is fixed (hence, not selected by the UE). For example, the SD basis includes all $$L_l = \frac{K_{SD}}{2}$$

SD antenna ports for each antenna polarization (for a dual-polarized antenna port layout at the gNB). Or, the SD basis includes all $L_l = K_{SD}$ SD antenna ports (for a co-polarized antenna port layout at the gNB). In one example, $K_{SD} = 2N_1 N_2$. In another example, $K_{SD} < 2N_1 N_2$. In one example, the UE can be configured with $K_{SD} = 2N_1 N_2$ or $K_{SD} < 2N_1 N_2$. In one example, $K_{SD} = S$ where S is fixed, e.g., {4,8}. Note that $K_{SD}$ is a number of CSI-RS ports in SD.

In embodiment AA, a variation of embodiment A, the SD basis is selected independently for each of the two antenna polarizations, according to at least one of Alt A-1 through Alt A-4.

In embodiment B, for FD/TD basis, the set of FD/TD beams $\{b_{l,f}\}_{f=0}^{M_l-1}$ comprising columns of $B_l$ is according to at least one of the following alternatives.

In one alternative Alt B-1, the FD/TD basis selection to similar to Alt A-1, i.e., the $M_l$ FD/TD units ports or column vectors of $B_l$ are selected by the index $$q_2 \in \left\{ 0, 1, \ldots, \left\lceil \frac{N_3}{e} \right\rceil - 1 \right\}$$

(this requires $$\left\lceil \log_2 \left\lceil \frac{N_3}{e} \right\rceil \right\rceil$$

bits), where $e \leq \min(N_3, M_l)$. In one example, $e \in \{1,2,3,4\}$. To select columns of $B_l$, the selection vectors are used. For instance, $b_f = v_z$, where the quantity $v_z$ is a $N_3$-element column vector containing a value of 1 in element (z mod $N_3$) and zeros elsewhere (where the first element is element 0). The selection matrix is then given by $$W_f = B_l = [v_{q_2 e} \ v_{q_2 e+1} \ \cdots \ v_{q_2 e+M_l-1}].$$

In one alternative Alt B-2, the FD/TD basis selects $M_l$ FD/TD units freely, i.e., the $M_l$ FD/TD units or column vectors of $B_l$ are selected freely by the index $$q_2 \in \left\{ 0, 1, \ldots, \binom{N_3}{M_l} - 1 \right\}$$

(this requires $$\left\lceil \log_2 \binom{N_3}{M_l} \right\rceil$$

bits). To select columns of $B_l$, the selection vectors are used. For instance, $b_f = v_z$, where the quantity $v_z$ is a $N_3$-element column vector containing a value of 1 in element (z mod $N_3$) and zeros elsewhere (where the first element is element 0). Let $\{x_0, x_1, \ldots, x_{M_l-1}\}$ be indices of selection vectors selected by the index $q_2$. The selection matrix is then given by $$W_f = B_l = \begin{bmatrix} v_{x_0} & v_{x_1} & \cdots & v_{x_{M_l-1}} \end{bmatrix}.$$

In one alternative Alt B-3, the FD/TD basis selects $M_l$ DFT beams from an oversampled DFT codebook, i.e., $b_f = w_f$, where the quantity $w_f$ is given by $$w_f = \begin{bmatrix} 1 & e^{j\frac{2\pi f}{O_3 N_3}} & \cdots & e^{j\frac{2\pi f(N_3-1)}{O_3 N_3}} \end{bmatrix}.$$

In one example, this selection of $M_l$ DFT beams is from a set of orthogonal DFT beams comprising $N_3$ DFT beams. In one example, $O_3 = 1$.

In one alternative Alt B-4, the FD/TD basis is fixed (hence, not selected by the UE). For example, the FD/TD basis includes all $M_l = K_{FD}$ FD antenna ports. In one example, $K_{FD} = N_3$. In another example, $K_{FD} < N_3$. In one example, the UE can be configured with $K_{FD} = N_3$ or $K_{FD} < N_3$. In one example, $K_{FD} \in S$ where S is fixed. Note that $K_{FD}$ is a number of CSI-RS ports in FD.

In one example, $K_{SD} \times K_{FD} = P_{CSIRS}$ is a total number of (beam-formed) CSI-RS ports.

In embodiment C, the SD and FD/TD bases are according to at least one of the alternatives in Table 2.

TABLE 2

| alternatives for SD and FD/TD bases | | |
|---|---|---|
| Alt | SD basis | FD/TD basis |
| C-0 | Alt A-1 | Alt B-1 |
| C-1 | | Alt B-2 |
| C-2 | | Alt B-3 |
| C-3 | | Alt B-4 |
| C-4 | Alt A-2 | Alt B-1 |
| C-5 | | Alt B-2 |
| C-6 | | Alt B-3 |
| C-7 | | Alt B-4 |
| C-8 | Alt A-3 | Alt B-1 |

TABLE 2-continued alternatives for SD and FD/TD bases

| Alt | SD basis | FD/TD basis |
|---|---|---|
| C-9 |  | Alt B-2 |
| C-10 |  | Alt B-3 |
| C-11 |  | Alt B-4 |

As defined above, $N_3$ is a number of FD units for PMI reporting and the PMI indicates $N_3$ precoding matrices, one for each FD unit. An FD unit can also be referred to as a PMI subband. Let $t \in \{0, 1, \ldots, N_3-1\}$ be an index to indicate an FD unit. Note that PMI subband can be different from CQI subband.

Let a parameter R indicate a number of PMI subbands in each CQI subband. As explained in Section 5.2.2.2.5 of [REF8], this parameter controls the total number of precoding matrices $N_3$ indicated by the PMI as a function of the number of subbands in csi-ReportingBand (configured to the UE for CSI reporting), the subband size ($N_{PRB}^{SB}$) configured by the higher-level parameter subbandSize and of the total number of PRBs in the bandwidth part according to Table 5.2.1.4-2 [REF8], as follows:

When R=1: One precoding matrix is indicated by the PMI for each subband in csi-ReportingBand.

When R=2:
  For each subband in csi-ReportingBand that is not the first or last subband of a band-width part (BWP), two precoding matrices are indicated by the PMI: the first precoding matrix corresponds to the first $N_{PRB}^{SB}/2$ PRBs of the subband and the second precoding matrix corresponds to the last $N_{PRB}^{SB}/2$ PRBs of the subband.

For each subband in csi-ReportingBand that is the first or last subband of a BWP
  If $$(N_{BWP,i}^{start} \bmod N_{PRB}^{SB}) \geq \frac{N_{PRB}^{SB}}{2},$$

one precoding matrix is indicated by the PMI corresponding to the first subband. If $$(N_{BWP,i}^{start} \bmod N_{PRB}^{SB}) < \frac{N_{PRB}^{SB}}{2},$$

two precoding matrices are indicated by the PMI corresponding to the first subband: the first precoding matrix corresponds to the first $$\frac{N_{PRB}^{SB}}{2} - (N_{BWP,i}^{start} \bmod N_{PRB}^{SB})$$

PRBs of the first subband and the second precoding matrix corresponds to the last $$\frac{N_{PRB}^{SB}}{2}$$

PRBs of the first subband. If $$(N_{BWP,i}^{start} + N_{BWP,i}^{size}) \bmod N_{PRB}^{SB} \leq \frac{N_{PRB}^{SB}}{2},$$

one precoding matrix is indicated by the PMI corresponding to the last subband. If $$(N_{BWP,i}^{start} + N_{BWP,i}^{size}) \bmod N_{PRB}^{SB} > \frac{N_{PRB}^{SB}}{2},$$

two precoding matrices are indicated by the PMI corresponding to the last subband: the first precoding matrix corresponds to the first $$\frac{N_{PRB}^{SB}}{2}$$

PRBs of the last subband and the second precoding matrix corresponds to the last $$(N_{BWP,i}^{start} + N_{BWP,i}^{size}) \bmod N_{PRB}^{SB} - \frac{N_{PRB}^{SB}}{2}$$

PRBs of the last subband.

When $R=N_{PRB}^{SB}$: One precoding matrix is indicated by the PMI for each PRB in csi-ReportingBand.

Here, $N_{BWP,i}^{start}$ and $N_{BWP,i}^{size}$ are a starting PRB index and a total number of PRBs in the BWP i.

In one example, R is fixed, e.g., R=2 or $R=N_{PRB}^{SB}$. In one example, R is configured, e.g., from $\{1,2\}$ or $\{1, 2, N_{PRB}^{SB}\}$ or $\{2, N_{PRB}^{SB}\}$. When R is configured, it is configured via a higher-layer parameter, e.g., numberOfPMISubbandsPerCQISubband.

Let $P_{CSIRS,SD}$ and $P_{CSIRS,FD}$ be a number of CSI-RS ports in SD and FD, respectively. The total number of CSI-RS ports is $P_{CSIRS,SD} \times P_{CSIRS,FD} = P_{CSIRS}$. Each CSI-RS port can be beam-formed/pre-coded using a pre-coding/beam-forming vector in SD or FD or both SD and FD. The pre-coding/beam-forming vector for each CSI-RS port can be derived based on UL channel estimation via SRS, assuming (partial) reciprocity between DL and UL channels. Since CSI-RS ports can be beam-formed in SD as well as FD, the Rel. 15/16 Type II port selection codebook can be extended to perform port selection in both SD and FD followed by linear combination of the selected ports. In the rest of the disclosure, some details pertaining to the CSI-RS configuration (beamforming, port numbering, number of CSIRS resources etc.) for this extension are provided.

In embodiment 1, a UE is configured with higher layer parameter codebookType set to ' typeII-PortSelection-r17' for CSI reporting based on a new (Rel. 17) Type II port selection codebook in which the port selection (which is in SD) in Rel. 15/16 Type II port selection codebook is extended to FD in addition to SD. The UE is also configured with $P_{CSIRS}$ CSI-RS ports (either in one CSI-RS resource or distributed across more than one CSI-RS resources) linked with the CSI reporting based on this new Type II port selection codebook. In one example, $P_{CSIRS}=Q$. In another example, $P_{CSIRS} \geq Q$. In another example, $P_{CSIRS} \leq Q$. Here, $Q=P_{CSIRS,SD} \times P_{CSIRS,FD}$. The UE measures $P_{CSIRS}$ (or at least Q) beam formed CSI-RS ports, estimates (beam-formed) DL channel, and determines a precoding matrix for each FD unit $t \in \{0, 1, \ldots, N_3-1\}$.

The value of $(P_{CSIRS,SD}/P_{CSIRS,FD})$ is determined according to at least one of the following examples. In one example, $(P_{CSIRS,SD}, P_{CSIRS,FD})=(2L, M)$. In one example, $(P_{CSIRS,SD}/P_{CSIRS,FD})=(2L, N_3)$. In one example, $(P_{CSIRS,SD}, P_{CSIRS,FD})=(U, N_3)$ where $U>2L$. In one example, $(P_{CSIRS,SD}, P_{CSIRS,FD})=(U, N_3)$ where $U>2L$. In one example, $(P_{CSIRS,SD}, P_{CSIRS,FD})=(2L, V)$ where $N_3>V>M$. In one example, $(P_{CSIRS,SD}, P_{CSIRS,FD})=(U, V)$ where $U>2L$ and $N_3>V>M$.

Note that Q is a number of (SD only or SD-FD) beam-forming basis vectors or bases conveyed via $P_{CSIRS}$ CSI-RS ports. When $P_{CSI-RS}=Q$, there is one-to-one mapping between the beamforming bases and CSI-RS ports, i.e., each CSI-RS port is beam-formed using one beamforming basis vector. When $Q \geq P_{CSIRS}$, a CSI-RS port conveys more than one beamforming basis vector, i.e., each CSI-RS port is beam-formed using more than one beamforming basis vectors. For example, when $P_{CSIRS,SD}=P_{CSIRS}$ and $P_{CSIRS,FD}=O_f$, then $Q=P_{CSIRS,SD} \times P_{CSIRS,FD}=O_f P_{CSIRS}$, and each CSI-RS port conveys $O_f$ beamforming basis vectors, and hence is beam-formed using $O_f$ beamforming basis vectors. In one example, $O_f$ is fixed, e.g., $O_f=2$. In one example, $O_f$ is configured from a set of supported values, e.g., $\{1,2\}$ or $\{1,2,4\}$ or $\{1,2,3\}$ or $\{1,M\}$. In one example, the set of supported values is reported by the UE as part of the UE capability reporting. In one example, $O_f=1$ is mandatory for all UEs supporting the proposed codebook in embodiment 1. The support of any additional value (e.g., $O_f=2$) or multiple values is subject to a separate UE capability signaling.

The value of $(P_{CSIRS}, O_f)$ is determined according to at least one of the following examples. In one example, $(P_{CSIRS}, O_f)=(2L, M)$. In one example, $(P_{CSIRS}, O_f)=(2L, N_3)$. In one example, $(P_{CSIRS}, O_f)=(U, M)$ where $U>2L$. In one example, $(P_{CSIRS}, O_f)=(U, N_3)$ where $U>2L$. In one example, $(P_{CSIRS}, O_f)=(2L, V)$ where $N_3>V>M$. In one example, $(P_{CSIRS}, O_f)=(U, V)$ where $U>2L$ and $N_3>V>M$.

In these examples, L, M, and $N_3$ are determined/configured (as explained above), and one or both of U and V are either fixed or configured. The parameters U and V determines intermediate sets of SD and FD ports, respectively. If $U>2L$, the UE performs SD port selection (2L out of U or L out of $$\frac{U}{2})$$

using the intermediate set of SD ports and reports the selected SD ports (as part of the CSI report). Likewise, if $V>M$, UE performs FD port selection (M out of V) using the intermediate set of FD ports and reports the selected FD ports (as part of the CSI report).

In one example, the first $$\frac{P_{CSIRS}}{2}$$

antenna ports, $$x, x+1, \ldots, x+\frac{P_{CSIRS}}{2}-1,$$

corresponds to the first antenna polarization and the last $$\frac{P_{CSIRS}}{2}$$

antenna ports.

$$x+\frac{P_{CSIRS}}{2}, x+\frac{P_{CSIRS}}{2}+1, \ldots, x+P_{CSIRS}-1,$$

corresponds to the second antenna polarization. In one example, x=3000.

Assuming $Q=P_{CSIRS,SD} \times P_{CSIRS,FD}$ or $P_{CSIRS} \times O_f$, a pre-coding/beam-forming vector to obtain a pre-coder/beam-formed CSI-RS port can be determined as follows.

Let $q=[q_0 \; q_1 \ldots q_{N-1}]$ be a $N \times 1$ pre-coding/beam-forming vector for SD, where N is a number of antennae used to obtain a beam-formed/pre-coded CSI-RS port in SD. In one example, $q=v_{m_1^{(i)}, m_2^{(i)}}$, where $i \in \{0, 1, \ldots, N_1 N_2-1\}$ is a DFT vector corresponding to a two-dimensional antenna layout with $N_1$ and $N_2$ antennae in first and second dimensions, respectively [(cf. 5.2.2.2.3, REFS]. In one example, q is an eigenvector of the UL channel (in SD by averaging over FD) estimated by the gNB using SRS. Note that: q is determined by gNB (hence, it is unknown or transparent to the UE).

Let $r=[r_0 \; r_1 \ldots r_{N_3-1}]$ be a $N_3 \times 1$ pre-coding/beam-forming vector for FD. In one example, $r_t=y_{t,l}^{(f)}$, hence, $r=[y_{0,l}^{(f)} \; y_{1,l}^{(f)} \ldots y_{N_3-1,l}^{(f)}]$, where $f \in \{0, 1, \ldots, N_3-1\}$ is a DFT vector. In one example, r is an eigenvector of the UL channel (in FD by averaging over SD) estimated by the gNB using SRS. Note that: r is determined by gNB (hence, it is unknown or transparent to the UE).

In FD unit $t=\{0, 1, \ldots, N_3-1\}$, a pre-coding/beam-forming vector is then given by $s=q \times r_t$. Note that s is common (the same) for both antenna polarizations. In one example, $s=w_{t,l}^{(i,f)}=v_{m_1^{(i)}, m_2^{(i)}} \times y_{t,l}^{(f)}$. Note that from one FD unit to another, the beam-forming/pre-coding vector for a given port changes since $r_t$ changes.

The numbering (or mapping) of a CSI-RS port x+j, where $j \in \{0, 1, \ldots, P_{CSIRS}-1\}$ and x=3000, to (SD, FD) port pair (i, f), where $i \in \{0, 1, \ldots, P_{CSIRS,SD}-1\}$ and $f \in \{0, 1, \ldots, P_{CSIRS,FD}-1\}$, or to the SD-FD beam-forming vector indices (i,f) where $i \in \{0, 1, \ldots, P_{CSIRS}-1\}$ and $f \in \{0, 1, \ldots, O_f-1\}$ is according to at least one of the following alternatives (Alt). The UE uses the port numbering to determine a $2L \times M$ coefficient matrix $\tilde{W}_2$ (cf. equation 5/5A).

In one alternative Alt 1.1, assuming all $P_{CSIRS}$ CSI-RS ports can be measured within each PRB of the configured BWP for CSI-RS measurement, the mapping of CSI-RS port j to the index pair (i, f) is the following order SD→FD, i.e., first in SD then in FD. One example is given by the following.

For the first antenna polarization $$\left(j \in \left\{0, 1, \ldots, \frac{P_{CSIRS}}{2}-1\right\}\right),$$

ports $$j = 0, 1, \ldots, \frac{P_{CSIRS,SD}}{2}-1$$

map to $$i = 0, 1, \ldots, \frac{P_{CSIRS,SD}}{2} - 1$$

and f=0, ports $$j = \frac{P_{CSIRS,SD}}{2}, \frac{P_{CSIRS,SD}}{2} + 1, \ldots, P_{CSIRS,SD} - 1$$

map to $$i = 0, 1, \ldots, \frac{P_{CSIRS,SD}}{2} - 1$$

and f=1, and so on. Mathematically, this is equivalent to $$i = j \bmod \frac{P_{CSIRS,SD}}{2} \text{ and } f = \left\lfloor \frac{2j}{P_{CSIRS,SD}} \right\rfloor = \frac{2(j-i)}{P_{CSIRS,SD}}.$$

For the second antenna polarization $$\left(j \in \left\{\frac{P_{CSIRS}}{2}, \frac{P_{CSIRS}}{2} + 1, \ldots, P_{CSIRS} - 1\right\}\right),$$

ports $$j = \frac{P_{CSIRS}}{2}, \frac{P_{CSIRS}}{2} + 1, \ldots, \frac{P_{CSIRS}}{2} + \frac{P_{CSIRS,SD}}{2} - 1$$

map to $$i = \frac{P_{CSIRS,SD}}{2}, \frac{P_{CSIRS,SD}}{2} + 1, \ldots, P_{CSIRS,SD} - 1$$

and f=0, ports $$j = \frac{P_{CSIRS}}{2} + \frac{P_{CSIRS,SD}}{2}, \frac{P_{CSIRS}}{2} + \frac{P_{CSIRS,SD}}{2} + 1,$$
$$\ldots, \frac{P_{CSIRS}}{2} + P_{CSIRS,SD} - 1$$

map to $$i = \frac{P_{CSIRS,SD}}{2}, \frac{P_{CSIRS,SD}}{2} + 1, \ldots, P_{CSIRS,SD} - 1$$

and f=1, and so on. Mathematically, this is equivalent to $$i = \frac{P_{CSIRS,SD}}{2} + \left(j - \frac{P_{CSIRS}}{2}\right) \bmod \frac{P_{CSIRS,SD}}{2} \text{ and } f =$$

$$\left\lfloor \frac{2\left(j - \frac{P_{CSIRS}}{2}\right)}{P_{CSIRS,SD}} \right\rfloor = \frac{2\left(\left(j - \frac{P_{CSIRS}}{2}\right) - \left(i - \frac{P_{CSIRS,SD}}{2}\right)\right)}{P_{CSIRS,SD}}.$$

Likewise, for the case when the mapping is between CSI-RS ports and the SD-FD beam-forming vector indices (i, f), where $i \in \{0, 1, \ldots, P_{CSIRS}-1\}$ and $f \in \{0, 1, \ldots, O_f-1\}$, the mapping of CSI-RS port j to the index pair (i, f) is the same as in Alt 1.1 except that the notation $P_{CSIRS,SD}$ and $P_{CSIRS,FD}$ are replaced with $P_{CSIRS}$ and $O_f$, respectively.

In one alternative Alt 1.1a, assuming all $P_{CSIRS}$ CSI-RS ports can be measured within each PRB of the configured BWP for CSI-RS measurement, the mapping of CSI-RS port j to the index pair (i, f) is the following order SD→FD, i.e., first in SD then in FD. One example is given by the following.

Ports j=0, 1, . . . , $P_{CSIRS,SD}-1$ map to i=0, 1, . . . , $P_{CSIRS,SD}-1$ and f=0, ports j=$P_{CSIRS,SD}$, $P_{CSIRS,SD}+1$, . . . , $2P_{CSIRS,SD}-1$ map to i=0, 1, . . . , $P_{CSIRS,SD}-1$ and f=1, and so on. Mathematically, this is equivalent to i=j mod $P_{CSIRS,SD}$ and $$f = \left\lfloor \frac{j}{P_{CSIRS,SD}} \right\rfloor = \frac{j-i}{P_{CSIRS,SD}}.$$

Likewise, for the case when the mapping is between CSI-RS ports and the SD-FD beam-forming vector indices (i, f), where $i \in \{0, 1, \ldots, P_{CSIRS}-1\}$ and $f \in \{0, 1, \ldots, O_f-1\}$, the mapping of CSI-RS port j to the index pair (i, f) is the same as in Alt 1.1a except that the notation $P_{CSIRS,SD}$ and $P_{CSIRS,FD}$ are replaced with $P_{CSIRS}$ and $O_f$, respectively.

In one alternative Alt 1.2, assuming all $P_{CSIRS}$ CSI-RS ports can be measured within each PRB of the configured BWP for CSI-RS measurement, the mapping of CSI-RS port j to the index pair (i, f) is the following order FD→SD, i.e., first in FD then in SD. One example is given by the following.

For the first antenna polarization $$\left(j \in \left\{0, 1, \ldots, \frac{P_{CSIRS}}{2} - 1\right\}\right),$$

ports j=0, 1, . . . , $P_{CSIRS,FD}-1$ map to i=0 and f=0, 1, . . . , $P_{CSIRS,FD}-1$, ports j=$P_{CSIRS,FD}$, $P_{CSIRS,FD}+1$, . . . , $2P_{CSIRS,FD}-1$ map to i=1 and f=0, 1, . . . , $P_{CSIRS,FD}-1$, and so on. Mathematically, this is equivalent to f=j mod $P_{CSIRS,FD}$ and $$i = \left\lfloor \frac{j}{P_{CSIRS,FD}} \right\rfloor = \frac{j-f}{P_{CSIRS,FD}}.$$

For the second antenna polarization $$\left(j \in \left\{\frac{P_{CSIRS}}{2}, \frac{P_{CSIRS}}{2} + 1, \ldots, P_{CSIRS} - 1\right\}\right),$$

ports $$j = \frac{P_{CSIRS}}{2}, \frac{P_{CSIRS}}{2}+1, \ldots, \frac{P_{CSIRS}}{2}+P_{CSIRS,FD}-1$$

map to $$i = \frac{P_{CSIRS,SD}}{2}$$

and f=0, 1, . . . , $P_{CSIRS,FD}$−1, ports $$j = \frac{P_{CSIRS}}{2} + P_{CSIRS,FD}, \frac{P_{CSIRS}}{2} + P_{CSIRS,FD}+1,$$

$$\ldots, \frac{P_{CSIRS}}{2} + 2P_{CSIRS,FD} - 1$$

map to $$i = \frac{P_{CSIRS,SD}}{2} + 1$$

and f=0, 1, . . . , $P_{CSIRS,FD}$−1, and so on. Mathematically, this is equivalent to $$f = \left(j - \frac{P_{CSIRS}}{2}\right) \mod P_{CSIRS,FD} \text{ and } i =$$

$$\frac{P_{CSIRS,SD}}{2} + \left\lfloor \frac{j - \frac{P_{CSIRS}}{2}}{P_{CSIRS,FD}} \right\rfloor = \frac{P_{CSIRS,SD}}{2} + \frac{\left(j - \frac{P_{CSIRS}}{2}\right) - f}{P_{CSIRS,FD}}.$$

Likewise, for the case when the mapping is between CSI-RS ports and the SD-FD beam-forming vector indices (i, f), where i∈ {0, 1, . . . , $P_{CSIRS}$−1} and f∈ {0, 1, . . . , $O_f$−1}, the mapping of CSI-RS port j to the index pair (i, f) is the same as in Alt 1.2 except that the notation $P_{CSIRS,SD}$ and $P_{CSIRS,FD}$ are replaced with $P_{CSIRS}$ and $O_f$, respectively.

In one alternative Alt 1.2a, assuming all $P_{CSIRS}$ CSI-RS ports can be measured within each PRB of the configured BWP for CSI-RS measurement, the mapping of CSI-RS port j to the index pair (i, f) is the following order FD→SD, i.e., first in FD then in SD. One example is given by the following.

Ports j=0, 1, . . . , $P_{CSIRS,FD}$−1 map to i=0 and f=0, 1, . . . , $P_{CSIRS,FD}$−1, ports j=$P_{CSIRS,FD}$, $P_{CSIRS,FD}$+1, . . . , 2$P_{CSIRS,FD}$−1 map to i=1 and f=0, 1, . . . , $P_{CSIRS,FD}$−1, and so on. Mathematically, this is equivalent to f=j mod $P_{CSIRS,FD}$ and $$i = \left\lfloor \frac{j}{P_{CSIRS,FD}} \right\rfloor = \frac{j-f}{P_{CSIRS,FD}}.$$

Likewise, for the case when the mapping is between CSI-RS ports and the SD-FD beam-forming vector indices (i, f), where i∈ {0, 1, . . . , $P_{CSIRS}$−1} and f∈ {0, 1, . . . , $O_f$−1}, the mapping of CSI-RS port j to the index pair (i, f) is the same as in Alt 1.2a except that the notation $P_{CSIRS,SD}$ and $P_{CSIRS,FD}$ are replaced with $P_{CSIRS}$ and $O_f$, respectively.

Figure 14:
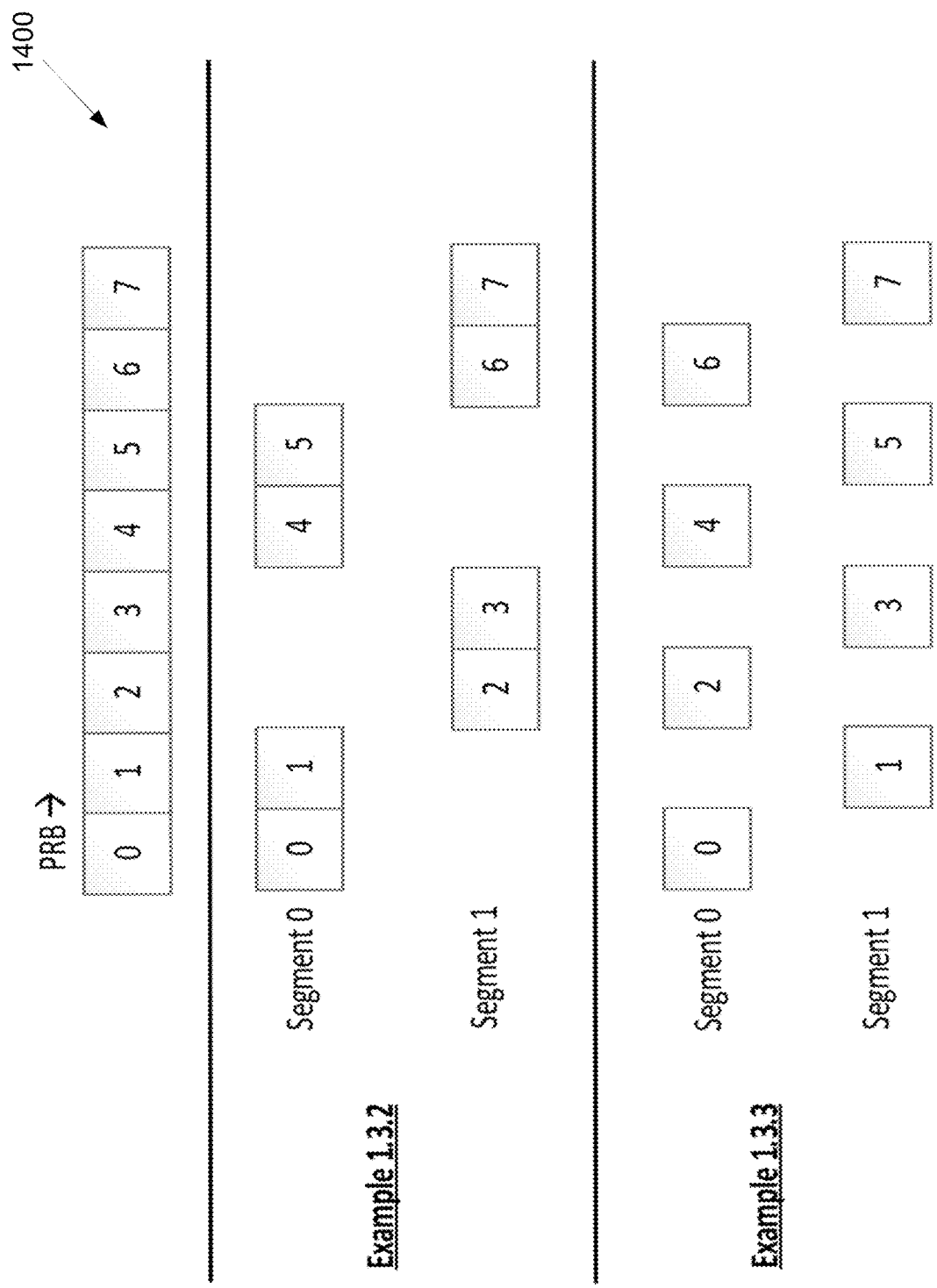
FIG. 14 illustrates an example mapping of CSI-RS ports to index pairs according to embodiments of the present disclosure.

FIG. 14 illustrates an example mapping of CSI-RS ports to index pairs 1400 according to embodiments of the present disclosure. The embodiment of the mapping of CSI-RS ports to index pairs 1400 illustrated in FIG. 14 is for illustration only. FIG. 14 does not limit the scope of this disclosure to any particular implementation of the mapping of CSI-RS ports to index pairs 1400.

In one alternative Alt 1.3, it is assumed that all $P_{CSIRS}$ CSI-RS ports can be measured across multiple PRBs (not within each PRB as in Alt 1.1/1.1a/1.2/1.2a), but the multiple PRBs are within each FD unit of the configured BWP for CSI-RS measurement. The mapping of CSI-RS port j to the index pair (i, f) is the following order SD→FD, i.e., first in SD then in FD across multiple PRBs. One of the following examples is used as illustrated in FIG. 14, In one example Ex 1.3.1, ports j=0, 1, . . . , $P_{CSIRS,SD}$−1 in the first PRB (index g=0) map to i=0, 1, . . . , $P_{CSIRS,SD}$−1 and f=0, ports j=0, 1, . . . , $P_{CSIRS,SD}$−1 in the second PRB (index g=1) map to i=0, 1, . . . , $P_{CSIRS,SD}$−1 and f=1, and so on. Mathematically, this is equivalent to i=j and f=g. This example requires that the number of PRBs in a FD unit equals M.

In one example Ex 1.3.2, it is assumed that the number of PRBs in a FD unit exceeds (or is greater than) M. The number of PRBs in a FD unit is partitioned into M segments where each segment comprises one or more than consecutive PRBs. The ports j=0, 1, . . . , $P_{CSIRS,SD}$−1 in all PRBs of the first segment (index s=0) map to i=0, 1, . . . , $P_{CSIRS,SD}$−1 and f=0, ports j=0, 1, . . . , $P_{CSIRS,SD}$−1 in all PRBs of the second segment (index s=1) map to i=0, 1, . . . , $P_{CSIRS,SD}$−1 and f=1, and so on. Mathematically, this is equivalent to i=j and f=s. Note that the first segment (index s=0) includes PRBs (g=0 to g=$y_0$), the second segment (index s=1) includes PRBs (g=$y_0$+1 to g=$y_1$), and so on.

In one example Ex 1.3.3, the number of PRBs in a CSI reporting band is partitioned into M segments with each segment s comprising all PRB indices s+d×M, where s=0, 1, . . . , M−1 and d=0, 1, . . . , X−1, and $$X = \frac{N_{PRB}}{M} \text{ or } \left\lceil \frac{N_{PRB}}{M} \right\rceil \text{ or } \left\lfloor \frac{N_{PRB}}{M} \right\rfloor,$$

and $N_{PRB}$ is a total number of PRBs in the CSI reporting band. The ports j=0, 1, . . . , $P_{CSIRS,SD}$−1 in all PRBs of the first segment (index s=0) map to i=0, 1, . . . , $P_{CSIRS,SD}$−1 and f=0, ports j=0, 1, . . . , $P_{CSIRS,SD}$−1 in all PRBs of the second segment (index s=1) map to i=0, 1, . . . , $P_{CSIRS,SD}$−1 and f=1, and so on. Note that when M=2, there are two segments, one comprising even-numbered PRB indices 0, 2, 4, . . . , and another comprising odd-numbered PRB indices 1, 3, 5, . . . .

Likewise, for the case when the mapping is between CSI-RS ports and the SD-FD beam-forming vector indices (i, f), where i∈ {0, 1, . . . , $P_{CSIRS}$−1} and f∈ {0, 1, . . . , $O_f$−1}, the mapping of CSI-RS port j to the index pair (i, f) is the same as in Alt 1.3 except that the notation $P_{CSIRS,SD}$ and $P_{CSIRS,FD}$ are replaced with $P_{CSIRS}$ and $O_f$, respectively.

In one alternative Alt 1.4, it is assumed that all $P_{CSIRS}$ CSI-RS ports can be measured via (across) multiple CSI-RS resources (not within a single CSI-RS resource as in Alt 1.1/1.1a/1.2/1.2a), but the multiple CSI-RS resources are measured within each PRB of the configured BWP for CSI-RS measurement. The mapping of CSI-RS port j to the index pair (i, f) is the following order SD→FD, i.e., first in SD then in FD across multiple CSI-RS resources. One example is given by the following.

Ports j=0, 1, ..., $P_{CSIRS,SD}-1$ in the first CSI-RS resource (index h=0) map to i=0, 1, ..., $P_{CSIRS,SD}-1$ and f=0, ports j=0, 1, ..., $P_{CSIRS,SD}-1$ in the second CSI-RS resource (index h=1) map to i=0, 1, ..., $P_{CSIRS,SD}-1$ and f=1, and so on. Mathematically, this is equivalent to i=j and f=h.

Likewise, for the case when the mapping is between CSI-RS ports and the SD-FD beam-forming vector indices (i, f), where i∈ {0, 1, ..., $P_{CSIRS}-1$} and f∈ {0, 1, ..., $O_f-1$}, the mapping of CSI-RS port j to the index pair (i, f) is the same as in Alt 1.4 except that the notation $P_{CSIRS,SD}$ and $P_{CSIRS,FD}$ are replaced with $P_{CSIRS}$ and $O_f$, respectively.

In one alternative Alt 1.5, it is assumed that all $P_{CSIRS}$ CSI-RS ports can be measured via (across) multiple time slots/instances (not within a single time slot/instance as in Alt 1.1/1.1a/1.2/1.2a), but all $P_{CSIRS}$ CSI-RS ports are measured within each PRB of the configured BWP for CSI-RS measurement. The mapping of CSI-RS port j to the index pair (i, f) is the following order SD→FD, i.e., first in SD then in FD across multiple time slots. One example is given by the following.

Ports j=0, 1, ..., $P_{CSIRS,SD}-1$ in the first time slot (index k=0) map to i=0, 1, ..., $P_{CSIRS,SD}-1$ and f=0, ports j=0, 1, ..., $P_{CSIRS,SD}-1$ in the second time slot (index k=1) map to i=0, 1, ..., $P_{CSIRS,SD}-1$ and f=1, and so on. Mathematically, this is equivalent to i=j and f=k.

In a variation, multiple time slots/instances correspond to a multi-shot transmission of a single CSI-RS resource in multiple time slots (which can be consecutive or separated in time, but their locations are known/configured to the UE). Alternatively, multiple time slots/instances correspond to one-shot transmissions of multiple CSI-RS resources that are separated in time.

Likewise, for the case when the mapping is between CSI-RS ports and the SD-FD beam-forming vector indices (i, f), where i∈ {0, 1, ..., $P_{CSIRS}-1$} and f∈ {0, 1, ..., $O_f-1$}, the mapping of CSI-RS port j to the index pair (i, f) is the same as in Alt 1.5 except that the notation $P_{CSIRS,SD}$ and $P_{CSIRS,FD}$ are replaced with $P_{CSIRS}$ and $O_f$, respectively.

In one alternative Alt 1.6, it is assumed that all $P_{CSIRS}$ CSI-RS ports can be measured across multiple PRBs and multiple CSI-RS resources (not within each PRB and a single CSI-RS resource as in Alt 1.1/1.1a/1.2/1.2a), but the multiple PRBs and multiple CSI-RS resources are within each FD unit of the configured BWP for CSI-RS measurement. For example, the $P_{CSIRS,FD}$ FD ports can be divided into T parts, each with $P_{CSIRS,FD}^{(1)}$ ports, i.e., $P_{CSIRS,FD}=P_{CSIRS,FD}^{(1)} \times T$, where T is the number of CSI-RS resources, and $P_{CSIRS,FD}^{(1)}$ is the number of FD ports associated with each CSI-RS resource. For each CSI resource, the UE measures $P_{CSIRS,SD}P_{CSIRS,FD}^{(1)}$ ports according to Alt 1.3, and measure ports for T such CSI-RS resources according to Alt 1.4.

Likewise, for the case when the mapping is between CSI-RS ports and the SD-FD beam-forming vector indices (i, f), where i∈ {0, 1, ..., $P_{CSIRS}-1$} and f∈ {0, 1, ..., $O_f-1$}, the mapping of CSI-RS port j to the index pair (i, f) is the same as in Alt 1.6 except that the notation $P_{CSIRS,SD}$ and $P_{CSIRS,FD}^{(1)}$ are replaced with $P_{CSIRS}$ and $O_f^{(1)}$, respectively, where $$O_f^{(1)} = \frac{O_f}{T}.$$

In one alternative Alt 1.7, it is assumed that all $P_{CSIRS}$ CSI-RS ports can be measured across multiple PRBs and multiple time slots (not within each PRB and a single time slot as in Alt 1.1/1.1a/1.2/1.2a), but the multiple PRBs are within each FD unit of the configured BWP for CSI-RS measurement. For example, the $P_{CSIRS,FD}$ FD ports can be divided into T parts, each with $P_{CSIRS,FD}^{(2)}$ ports, i.e., $P_{CSIRS,FD}=P_{CSIRS,FD}^{(2)} \times U$, where U is the number of time slots, and $P_{CSIRS,FD}^{(2)}$ is the number of FD ports associated with each time slot. For each time slot, the UE measures $P_{CSIRS,SD}P_{CSIRS,FD}^{(2)}$ ports according to Alt 1.3, and measure ports for U such time slots according to Alt 1.5.

Likewise, for the case when the mapping is between CSI-RS ports and the SD-FD beam-forming vector indices (i, f), where i∈ {0, 1, ..., $P_{CSIRS}-1$} and f∈ {0, 1, ..., $O_f-1$}, the mapping of CSI-RS port j to the index pair (i, f) is the same as in Alt 1.7 except that the notation $P_{CSIRS,SD}$ and $P_{CSIRS,FD}^{(1)}$ are replaced with $P_{CSIRS}$ and $O_f^{(1)}$, respectively, where $$O_f^{(1)} = \frac{O_f}{T}.$$

In one alternative Alt 1.8, it is assumed that all $P_{CSIRS}$ CSI-RS ports can be measured via (across) multiple CSI-RS resources and multiple time slots (not within a single CSI-RS resource and a single time slot/instance as in Alt 1.1/1.1a/1.2/1.2a), but the multiple CSI-RS resources are measured within each PRB of the configured BWP for CSI-RS measurement. For example, the $P_{CSIRS,FD}$ FD ports can be divided into TU parts, each with $P_{CSIRS,FD}^{(1)}P_{CSIRS,FD}^{(2)}$ ports i.e., $P_{CSIRS,FD}=P_{CSIRS,FD}^{(1)}P_{CSIRS,FD}^{(2)} \times TU$, where T is the number of CSI-RS resources, U is the number of time slots, $P_{CSIRS,FD}^{(1)}P_{CSIRS,FD}^{(2)}$ is the number of FD ports associated with each CSI-RS resource and each time slot, and $P_{CSIRS,FD}^{(1)}$ is the number of FD ports associated with each CSI-RS resource. For each CSI resource and for each time slot, the UE measures $P_{CSIRS,SD}P_{CSIRS,FD}^{(1)}P_{CSIRS,FD}^{(2)}$ ports according to Alt 1.1/1.1a/1/2/1/2a, and measure ports for TU such combinations of CSI-RS resources and time slots.

Likewise, for the case when the mapping is between CSI-RS ports and the SD-FD beam-forming vector indices (i, f), where i∈ {0, 1, ..., $P_{CSIRS}-1$} and f∈ {0, 1, ..., $O_f-1$}, the mapping of CSI-RS port j to the index pair (i, f) is the same as in Alt 1.8 except that the notation $P_{CSIRS,SD}$, $P_{CSIRS,FD}^{(1)}$ and $P_{CSIRS,FD}^{(2)}$ are replaced with $P_{CSIRS}$, $O_f^{(1)}$, and $O_f^{(2)}$, respectively, where $$O_f^{(1)} = \frac{O_f}{T} \text{ and } O_f^{(2)} = \frac{O_f}{U}.$$

In one alternative Alt 1.9, it is assumed that all $P_{CSIRS}$ CSI-RS ports can be measured via (across) multiple PRBs, multiple CSI-RS resources, and multiple time slots (not within each PRB, a single CSI-RS resource, and a single time slot/instance as in Alt 1.1/1.1a/1.2/1.2a), but the multiple CSI-RS resources are measured within each PRB of the configured BWP for CSI-RS measurement.

In some of the above alternatives, when the number of CSI-RS resources is more than one, at least one of the following examples is used for CRI reporting. In one example, the number of CSI-RS resources equals M, hence all CSI-RS resources are used to construct $\tilde{W}_2$, and CRI is not reported. In another example, the number of CSI-RS resources exceeds (or is greater than) M, hence M CSI-RS resources are selected by the UE, and the selected CSI-RS resources are reported as part of the CSI report, for example, using a single CRI indicating the selected CSI-RS resources or using multiple CRIs (e.g., 1 CRI for 1 selected CSI-RS resource).

In some of the above alternatives, when the number of time slots is more than one, at least one of the following examples is used for an indicator (SI) indicating the selected time slots. In one example, the number of time slots equals M, hence CSI-RS ports measured in all time slots are used to construct $\tilde{W}_2$ and SI is not reported. In another example, the number of time slots exceeds (or is greater than) M, hence M time slots are selected by the UE, and the selected time slots are reported as part of the CSI report, for example, using a single indicator (e.g., slot indicator SI) indicating the selected time slots or using multiple indicators (e.g., 1 SI for 1 selected time slot).

In one example, only one of the above alternatives for port numbering or the mapping between CSI-RS ports and the SD-FD beam-forming vector indices is used (hence fixed), for example, Alt 1.1 is used. In another example, more than one of the above alternatives for port numbering or the mapping between CSI-RS ports and the SD-FD beam-forming vector indices can be used, and one them is configured (for example, via higher layer RRC signaling).

In some of the above alternatives, when the number of CSI-RS resources is more than one, at least one of the following examples is used regarding the band-widths BWs of the CSI-RS resources. Let $B_i$ be the BW of the i-th CSI-RS resource. In one example, the BWs of all CSI-RS resources are the same, i.e., $B_i$=B for all i, and they are within the CSI reporting band, i.e., B is a subset of the CSI reporting band. In another example, two of the multiple CSI-RS resources (i and j) can have different BWs, i.e., $B_i \neq B_j$ for some i and j, but they are within the CSI reporting band, i.e., $B_i$ and $B_j$ are subsets of the CSI reporting band. In another example, when the number of CSI-RS resources equals two, one resource occupies even numbered PRBs of the CSI reporting band and another occupies odd numbered PRBs of the CSI reporting band, and each of the two CSI-RS resources has $$\frac{P_{CSIRS}}{2}$$

CSI-RS ports. In another example, when the number of CSI-RS resources equals two, one resource occupies one half of the total PRBs of the CSI reporting band and another occupies odd another half of the total PRBs of the CSI reporting band, and each of the two CSI-RS resources has $$\frac{P_{CSIRS}}{2}$$

CSI-RS ports.

In another example, when the number of CSI-RS resources equals $O_f \geq 1$, each resource occupies (transmitted in) a segment (portion) of the CSI reporting band comprising $N_{PRB}$ PRBs. In one example, the details about the segments is as explained in Example 1.3.3. In one example, each of $O_f$ CSI-RS resources has the same number of CSI-RS ports. In one example, the number of CSI-RS ports can be different across CSI-RS resources.

In embodiment 2, a UE is configured with one or multiple CSI-RS resources satisfying some constraints or restrictions when configured for the purpose CSI reporting as explained in embodiment 1. At least one of the following alternatives is used as constraint or restriction.

In one alternative Alt 2.1, the restriction is on the number of CSI-RS ports $P_{CSIRS}$. Note that the number of CSI-RS ports $P_{CSIRS} \in S_1$={4,8,12,16,24,32} in Rel. 15/16 NR. At least one of the following examples is used.

In one example Ex 2.1.1, $P_{CSIRS} \in S_1$={4,8,12,16,24,32}.

In one example Ex 2.1.2, $P_{CSIRS} \in S_2$ where $S_2$ is a union of {4,8,12,16,24,32} and a set of additional values T.

In one example, T includes values less than 32. For example, T={20,28}, hence $S_2$={4,8,12,16,20,24,28,32}.

In one example, T includes values greater than 32. For example, T={36,40}, hence $S_2$={4,8,12,16,24,32,36,40}.

In one example, T includes values less than 32 or greater than 32. For example, T={20,28,36,40}, hence $S_2$={4,8,12,16,20,24,28,32,36,40}.

In one example Ex 2.1.3, $P_{CSIRS} \in S_3$ where $S_3$ is a subset of {4,8,12,16,24,32}.

In one example, $S_3$={8,12,16,24,32}.

In one example, $S_3$ is determined such that $P_{CSIRS}$=a× 2LM, where a is a positive integer. For example, a=1 or a∈{1,2}. Or, the value a may depend on the value of (L, M) or 2LM.

In one example, $S_3$ is determined such that $$P_{CSIRS} = \frac{1}{a} \times 2LM,$$

where a is a positive integer. For example, a=1 or a∈{1,2}. Or, the value a may depend on the value of (L, M) or 2LM.

In one alternative Alt 2.2, the restriction is on the density d (defined as a number of REs per PRB per CSI-RS port) of CSI-RS ports $P_{CSIRS}$. Note that the density d∈{0,5,1,3} in Rel. 15/16 NR. At least one of the following examples is used.

In one example Ex 2.2.0, the density is restricted to d=0.25 only.

In one example Ex 2.2.1, the density is restricted to d=0.5 only.

In one example Ex 2.2.2, the density is restricted to d=1 only.

In one example Ex 2.2.3, the density is restricted to d=1 or d=0.5 based on a fixed condition. At least one of the following examples is used for the fixed condition.

In one example, d=1 when $P_{CSIRS} \leq p$ and d=0.5 when $P_{CSIRS} > p$. For example, p=8 or 16.

In one example, d=1 when 2LM≤q and d=0.5 when 2LM>q. For example, q=8 or 16.

In one example, d=1 when L=2 and d=0.5 when L=4.

In one example Ex 2.2.4, the density is restricted to $x/O_f$ where x=1 or 0.5, and $O_f$ is according to some embodiments of this disclosure.

In one example Ex 2.2.5, the density is restricted to d=1 or d=x/$O_f$ based on a fixed condition, where x=1 or 0.5, and $O_f$ is according to some embodiments of this disclosure. At least one of the following examples is used for the fixed condition.

In one example, d=1 when $P_{CSIRS} \leq p$ and d=x/$O_f$ when $P_{CSIRS} > p$. For example, p=8 or 16.

In one example, d=1 when 2LM≤q and d=x/$O_f$ when 2LM>q. For example, q=8 or 16.

In one example, d=1 when L=2 and d=x/$O_f$ when L=4.

In one example, the density d is configured from a set of supported values, e.g., {x, x/$O_f$}. In one example, the set of supported values is reported by the UE as part of the UE capability reporting. In one example, d=x is mandatory for all UEs supporting the proposed codebook in embodiment 1. The support of any additional value (e.g., $$d = \frac{x}{O_f})$$

or multiple values is subject to a separate UE capability signaling.

In one alternative Alt 2.3, the restriction is on the set of supported combination for parameters such as $P_{CSIRS}$, L, $p_v$, and β. At least one of the following examples is used.

In one example Ex 2.3.1, the restriction is on the set of supported combination for parameters ($P_{CSIRS}$, L, $p_v$) for rank 1-2 only (v∈{1,2}). An example of the value for (L, $p_v$) is shown in Table 3. The set of supported combination for parameters ($P_{CSIRS}$, L, $p_v$) for rank 1-2 includes ($P_{CSIRS}$, L, $p_v$) such that 2LM$_v$≤$P_{CSIRS}$, (L, $p_v$) is according to Table 3 and $P_{CSIRS}$∈$S_1$={4,8,12,16,24, 32}.

TABLE 3

| paramCombination-r17 | L | $p_v$ v ∈ {1, 2} |
|---|---|---|
| 1 | 2 | 1/8 |
| 2 | 2 | 1/4 |
| 3 | 4 | 1/4 |
| 4 | 4 | 1/2 |

In one example Ex 2.3.2, the restriction is on the set of supported combination for parameters ($P_{CSIRS}$, L, $P_v$, β) for rank 1-2 only (v∈{1,2}). An example of the value for (L, $p_v$, β) is shown in Table 4. The set of supported combination for parameters ($P_{CSIRS}$, L, $p_v$, β) for rank 1-2 includes ($P_{CSIRS}$, L, $p_v$) such that 2LM$_v$≤$P_{CSIRS}$, (L, $P_v$) is according to Table 4 and $P_{CSIRS}$ ∈$S_1$={4,8,12, 16,24,32}, and the UE reports at most $K_0$=⌈β2L$M_1$⌉ nonzero coefficients (of $\tilde{W}_2$) for layer l=1, . . . , v.

TABLE 4

| paramCombination-r17 | L | $p_v$ v ∈ {1, 2} | β |
|---|---|---|---|
| 1 | 2 | 1/4 | 1/4 |
| 2 | 2 | 1/4 | 1/2 |
| 3 | 4 | 1/4 | 1/4 |
| 4 | 4 | 1/4 | 1/2 |
| 5 | 4 | 1/4 | 3/4 |
| 6 | 4 | 1/2 | 1/2 |

In Ex 2.3.3, the restriction is on the set of supported combination for parameters ($P_{CSIRS}$, L, $p_v$, β) for rank 1-4 (v∈{1,2,3,4}). An example of the value for (L, $p_v$, β) is shown in Table 5. The set of supported combination for parameters ($P_{CSIRS}$, L, $p_v$, β) for rank 1-4 includes ($P_{CSIRS}$, L, $p_v$) such that 2LM$_v$≤$P_{CSIRS}$, (L, $p_v$) is according to Table 5 and $P_{CSIRS}$ ∈$S_1$={4,8,12,16,24, 32}, and the UE reports at most $K_0$=⌈β2L$M_1$⌉ nonzero coefficients (of $\tilde{W}_2$) for layer l=1, . . . , v.

TABLE 5

| paramCombination-r17 | L | $p_v$ v ∈ {1, 2} | $p_v$ v ∈ {3, 4} | β |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |

In one alternative Alt 2.4, the restriction is on the time domain configuration. At least one of the following examples is used.

In one example Ex 2.4.1, when there is only one CSI-RS resource, the CSI-RS resource is aperiodic (triggered via DCI).

In one example Ex 2.4.2, when there is only one CSI-RS resource, the CSI-RS resource is semi-persistent (SP) (activated/deactivated via MAC CE activation/deactivation command). In one example, the SP CSI-RS transmission corresponds to a multi-shot transmission with a number of transmission instances (time slots) equal to M or a multiple of M.

In one example Ex 2.4.3, when there is only one CSI-RS resource, the CSI-RS resource is aperiodic (triggered via DCI) or semi-persistent (activated/deactivated via MAC CE activation/deactivation command) based on a fixed condition. At least one of the following examples is used for the fixed condition.

In one example, the CSI-RS resource is aperiodic when $P_{CSIRS}$≤p and the CSI-RS resource is semi-persistent when $P_{CSIRS}$>p. For example, p=8 or 16.

In one example, the CSI-RS resource is aperiodic when 2LM≤q and the CSI-RS resource is semi-persistent when 2LM>q. For example, q=8 or 16.

In one example, the CSI-RS resource is aperiodic when L=2 and the CSI-RS resource is semi-persistent when L=4.

In one example Ex 2.4.4, when there are multiple CSI-RS resources, the CSI-RS resources are all aperiodic (triggered via DCI), but they are transmitted in different time slots (i.e., 1 CSI-RS resource is transmitted in each time slot).

In one example Ex 2.4.5, when there are multiple CSI-RS resources, the CSI-RS resources are all aperiodic (triggered via DCI), and up to Z CSI-RS resources can be transmitted in the same time slot. If there are more than Z CSI-RS resources, then some of them are transmitted in different time slots (i.e., up to Z CSI-RS resources can be transmitted in each time slot). In one example, Z=2.

Any of the above variation embodiments can be utilized independently or in combination with at least one other variation embodiment.

Figure 15:
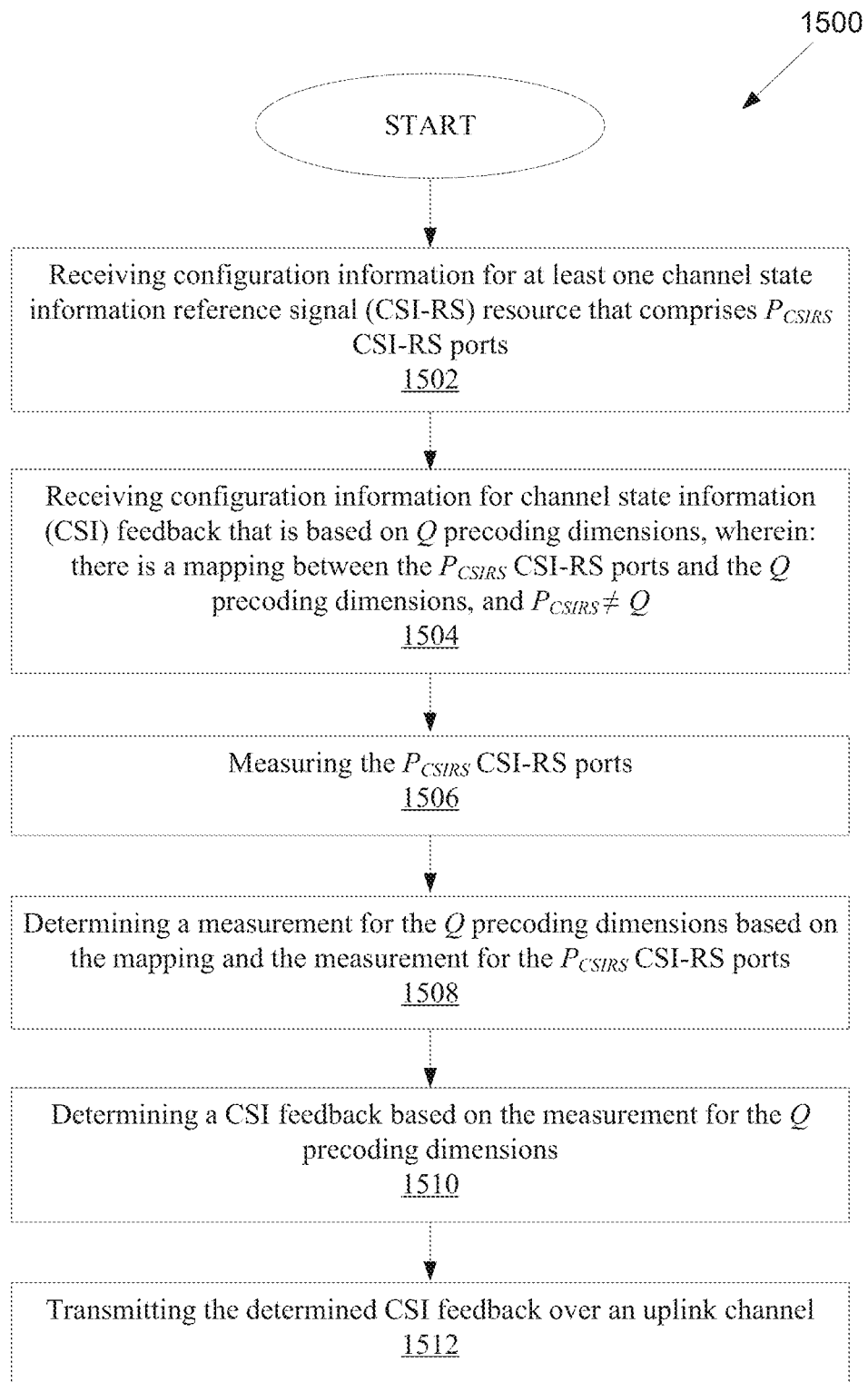
FIG. 15 illustrates a flow chart of a method for operating a UE according to embodiments of the present disclosure.

FIG. 15 illustrates a flow chart of a method 1500 for operating a user equipment (UE), as may be performed by a UE such as UE 116, according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the UE (e.g., 111-116 as illustrated in FIG. 1) receives configuration information for at least one channel state information reference signal (CSI-RS) resource that comprises $P_{CSIRS}$ CSI-RS ports.

In step 1504, the UE receives configuration information for channel state information (CSI) feedback that is based on Q precoding dimensions, wherein: there is a mapping between the $P_{CSIRS}$ CSI-RS ports and the Q precoding dimensions, and $P_{CSIRS} \neq Q$.

In step 1506, the UE measures the $P_{CSIRS}$ CSI-RS ports.

In step 1508, the UE determines a measurement for the Q precoding dimensions based on the mapping and the measurement for the $P_{CSIRS}$ CSI-RS ports.

In step 1510, the UE determines a CSI feedback based on the measurement for the Q precoding dimensions.

In step 1512, the UE transmits, over an uplink (UL) channel, the determined CSI feedback.

In one embodiment, a precoding dimension is associated with a CSI-RS port via a beamforming vector that precodes the CSI-RS resource transmitted from the CSI-RS port.

In one embodiment, $P_{CSIRS} \times O_f = Q$, wherein $O_f$ = a number of precoding dimensions per CSI-RS port.

In one embodiment, the mapping corresponds to a frequency division multiplexing (FDM) of the $O_f$ precoding dimensions via each CSI-RS port.

In one embodiment, $O_f = 2$, and the FDM is such that a first precoding dimension is associated with even numbered physical resource blocks (PRBs) and a second precoding dimension is associated with odd numbered PRBs.

In one embodiment, the mapping is based on multiple CSI-RS resources such that: a number of CSI-RS resources $$O_f = \frac{Q}{P_{CSIRS}};$$

Q = a total number of precoding dimensions across $O_f$ CSI-RS resources; $P_{CSIRS}$ = a number of CSI-RS ports per CSI-RS resource.

In one embodiment, the mapping is based on a value of CSI-RS density, where the value of the CSI-RS density is configured such that the Q precoding dimensions are conveyed based on the $P_{CSIRS}$ CSI-RS ports.

Figure 16:
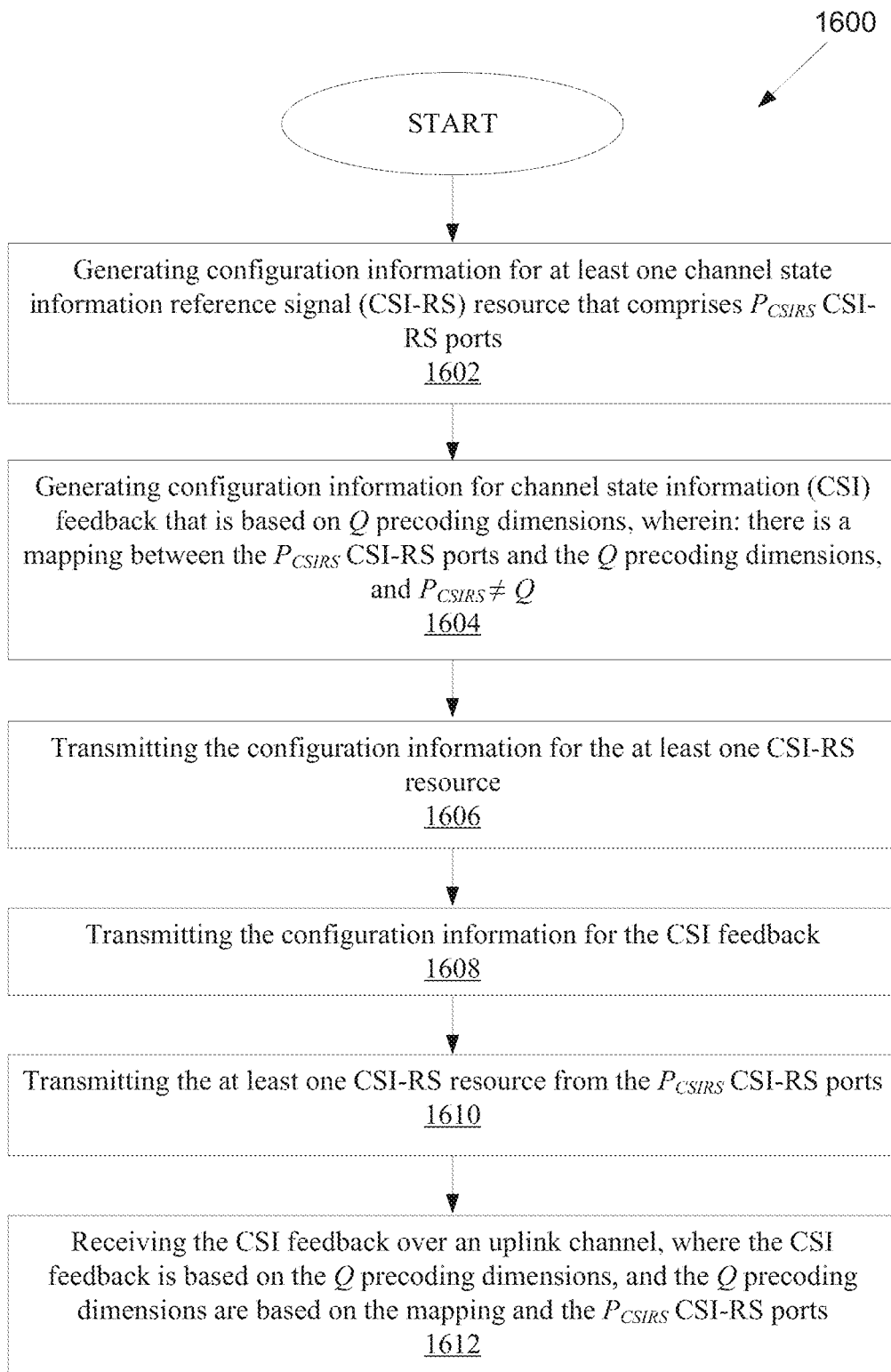
FIG. 16 illustrates a flow chart of a method for operating a BS according to embodiments of the present disclosure.

FIG. 16 illustrates a flow chart of another method 1600, as may be performed by a base station (BS) such as BS 102, according to embodiments of the present disclosure. The embodiment of the method 1600 illustrated in FIG. 16 is for illustration only. FIG. 16 does not limit the scope of this disclosure to any particular implementation.

As illustrated in FIG. 16, the method 1600 begins at step 1602. In step 1602, the BS (e.g., 101-103 as illustrated in FIG. 1), generates configuration information for at least one channel state information reference signal (CSI-RS) resource that comprises $P_{CSIRS}$ CSI-RS ports.

In step 1604, the BS generates configuration information for channel state information (CSI) feedback that is based on Q precoding dimensions, wherein: there is a mapping between the $P_{CSIRS}$ CSI-RS ports and the Q precoding dimensions, and $P_{CSIRS} \neq Q$.

In step 1606, the BS transmits the configuration information for the at least one CSI-RS resource.

In step 1608, the BS transmits the configuration information for the CSI feedback.

In step 1610, the BS transmits the at least one CSI-RS resource from the $P_{CSIRS}$ CSI-RS ports.

In step 1612, the BS receives, over an uplink (UL) channel, the CSI feedback; wherein: the CSI feedback is based on the Q precoding dimensions, and the Q precoding dimensions are based on the mapping and the $P_{CSIRS}$ CSI-RS ports.

In one embodiment, wherein a precoding dimension is associated with a CSI-RS port via a beamforming vector that precodes the CSI-RS resource transmitted from the CSI-RS port.

In one embodiment, $P_{CSIRS} \times O_f = Q$, wherein $O_f$ = a number of precoding dimensions per CSI-RS port.

In one embodiment, the mapping corresponds to a frequency division multiplexing (FDM) of the $O_f$ precoding dimensions via each CSI-RS port.

In one embodiment, $O_f = 2$, and the FDM is such that a first precoding dimension is associated with even numbered PRBs and a second precoding dimension is associated with odd numbered PRBs.

In one embodiment, the mapping is based on multiple CSI-RS resources such that: a number of CSI-RS resources $$O_f = \frac{Q}{P_{CSIRS}};$$

Q = a total number of precoding dimensions across $O_f$ CSI-RS resources; $P_{CSIRS}$ = a number of CSI-RS ports per CSI-RS resource.

In one embodiment, the mapping is based on a value of CSI-RS density, where the value of the CSI-RS density is configured such that the Q precoding dimensions are conveyed based on the $P_{CSIRS}$ CSI-RS ports.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive configuration information for at least one channel state information reference signal (CSI-RS) resource that comprises a number ($P_{CSIRS}$) of CSI-RS ports ($P_{CSIRS}$ CSI-RS ports); and
receive configuration information for channel state information (CSI) feedback that is based on a number (Q) of precoding dimensions (Q precoding dimensions),
wherein:
there is a mapping between the $P_{CSIRS}$ CSI-RS ports and the Q precoding dimensions, and
$P_{CSIRS} \neq Q$; and
a processor operably coupled to the transceiver, the processor configured to:
measure the $P_{CSIRS}$ CSI-RS ports;
determine a measurement for the Q precoding dimensions based on the mapping and the measurement for the $P_{CSIRS}$ CSI-RS ports; and
determine a CSI feedback based on the measurement for the Q precoding dimensions;
wherein the transceiver is further configured to transmit, over an uplink (UL) channel, the determined CSI feedback.

2. The UE of claim 1, wherein each precoding dimension is associated with a CSI-RS port via a beamforming vector that precodes the CSI-RS resource transmitted from the CSI-RS port.

3. The UE of claim 1, wherein $P_{CSIRS} \times O_f = Q$, wherein $O_f$=a number of precoding dimensions per CSI-RS port.

4. The UE of claim 3, wherein the mapping corresponds to a frequency division multiplexing (FDM) of the $O_f$ precoding dimensions via each CSI-RS port.

5. The UE of claim 4, wherein $O_f=2$, and the FDM is such that a first precoding dimension is associated with even numbered physical resource blocks (PRBs) and a second precoding dimension is associated with odd numbered PRBs.

6. The UE of claim 1, wherein the mapping is based on multiple CSI-RS resources such that:

a number of CSI-RS resources $$O_f = \frac{Q}{P_{CSIRS}};$$

Q=a total number of precoding dimensions across $O_f$ CSI-RS resources; and $P_{CSIRS}$=a number of CSI-RS ports per CSI-RS resource.

7. The UE of claim 1, wherein the mapping is based on a value of CSI-RS density, where the value of the CSI-RS density is configured such that the Q precoding dimensions are conveyed based on the $P_{CSIRS}$ CSI-RS ports.

8. A base station (BS) comprising:
a processor configured to:
generate configuration information for at least one channel state information reference signal (CSI-RS) resource that comprises a number ($P_{CSIRS}$) of ports CSI-RS ($P_{CSIRS}$ CSI-RS ports); and
generate configuration information for channel state information (CSI) feedback that is based on a number (Q) of precoding dimensions (Q precoding dimensions),
wherein:
there is a mapping between the $P_{CSIRS}$ CSI-RS ports and the Q precoding dimensions, and
$P_{CSIRS} \neq Q$; and
a transceiver operably coupled to the processor, the transceiver configured to:
transmit the configuration information for the at least one CSI-RS resource;
transmit the configuration information for the CSI feedback;
transmit the at least one CSI-RS resource from the $P_{CSIRS}$ CSI-RS ports; and
receive, over an uplink (UL) channel, the CSI feedback;
wherein:
the CSI feedback is based on the Q precoding dimensions, and
the Q precoding dimensions are based on the mapping and the $P_{CSIRS}$ CSI-RS ports.

9. The BS of claim 8, wherein each precoding dimension is associated with a CSI-RS port via a beamforming vector that precodes the CSI-RS resource transmitted from the CSI-RS port.

10. The BS of claim 8, wherein $P_{CSIRS} \times O_f = Q$, wherein $O_f$=a number of precoding dimensions per CSI-RS port.

11. The BS of claim 10, wherein the mapping corresponds to a frequency division multiplexing (FDM) of the $O_f$ precoding dimensions via each CSI-RS port.

12. The BS of claim 11, wherein $O_f=2$, and the FDM is such that a first precoding dimension is associated with even numbered PRBs and a second precoding dimension is associated with odd numbered PRBs.

13. The BS of claim 8, wherein the mapping is based on multiple CSI-RS resources such that:

a number of CSI-RS resources $$O_f = \frac{Q}{P_{CSIRS}};$$

Q=a total number of precoding dimensions across $O_f$ CSI-RS resources; and $P_{CSIRS}$=a number of CSI-RS ports per CSI-RS resource.

14. The BS of claim 8, wherein the mapping is based on a value of CSI-RS density, where the value of the CSI-RS density is configured such that the Q precoding dimensions are conveyed based on the $P_{CSIRS}$ CSI-RS ports.

15. A method for operating a user equipment (UE), the method comprising:

receiving configuration information for at least one channel state information reference signal (CSI-RS) resource that comprises a number ($P_{CSIRS}$) of CSI-RS ports ($P_{CSIRS}$ CSI-RS ports); and receiving configuration information for channel state information (CSI) feedback that is based on a number (Q) of precoding dimensions (Q precoding dimensions), wherein:
there is a mapping between the $P_{CSIRS}$ CSI-RS ports and the Q precoding dimensions, and
$P_{CSIRS} \neq Q$;

measuring the $P_{CSIRS}$ CSI-RS ports;

determining a measurement for the Q precoding dimensions based on the mapping and the measurement for the $P_{CSIRS}$ CSI-RS ports;

determining a CSI feedback based on the measurement for the Q precoding dimensions; and transmitting, over an uplink (UL) channel, the determined CSI feedback.

16. The method of claim 15, wherein each precoding dimension is associated with a CSI-RS port via a beamforming vector that precodes the CSI-RS resource transmitted from the CSI-RS port.

17. The method of claim 15, wherein $P_{CSIRS} \times O_f = Q$, wherein $O_f$=a number of precoding dimensions per CSI-RS port.

18. The method of claim 17, wherein the mapping corresponds to a frequency division multiplexing (FDM) of the $O_f$ precoding dimensions via each CSI-RS port.

19. The method of claim 18, wherein $O_f=2$, and the FDM is such that a first precoding dimension is associated with even numbered PRBs and a second precoding dimension is associated with odd numbered PRBs.

20. The method of claim 15, wherein the mapping is based on multiple CSI-RS resources such that:

a number of CSI-RS resources $$O_f = \frac{Q}{P_{CSIRS}};$$

Q = a total number of precoding dimensions across $O_f$ CSI-RS resources; and $P_{CSIRS}$ = a number of CSI-RS ports per CSI-RS resource.

* * * * *